US012627680B2

(12) United States Patent
Leung et al.

(10) Patent No.: US 12,627,680 B2
(45) Date of Patent: May 12, 2026

(54) MANAGING AND DEPLOYING CUSTOM INTRUSION DETECTION SYSTEM SIGNATURE POLICIES

(71) Applicant: Visa International Service Association, San Francisco, CA (US)

(72) Inventors: Christophe Leung, Reston, VA (US); Kyle Rabago-Banjo, San Francisco, CA (US); Grant Blankenship, Lakewood, CO (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 303 days.

(21) Appl. No.: 18/491,106

(22) Filed: Oct. 20, 2023

(65) Prior Publication Data

US 2024/0137372 A1      Apr. 25, 2024
US 2024/0236120 A9      Jul. 11, 2024

Related U.S. Application Data

(60) Provisional application No. 63/419,114, filed on Oct. 25, 2022.

(51) Int. Cl.
*H04L 9/40*           (2022.01)

(52) U.S. Cl.
CPC .......... *H04L 63/1416* (2013.01); *H04L 63/20* (2013.01)

(58) Field of Classification Search
None
See application file for complete search history.

(56) References Cited

U.S. PATENT DOCUMENTS 12,166,793 B2 * 12/2024 Jain ..................... H04L 63/1416
2015/0033322 A1 *  1/2015 Wang .................. H04L 63/0245
726/13

(Continued)

OTHER PUBLICATIONS

Corelight, Inc., "How Corelight Accelerates Incident Response with Zeek and Suricata", 2020, 5 pages, WP016-Zeek/Suricata-V1.1-US.

*Primary Examiner* — Joseph P Hirl
*Assistant Examiner* — Hassan Saadoun
(74) *Attorney, Agent, or Firm* — Kilpatrick Townsend & Stockton LLP

(57) ABSTRACT

Methods and systems for deploying intrusion detection system (IDS) policies to IDS programs are disclosed. Each IDS instance can monitor a data feed (e.g., comprising computer network traffic) in accordance with a set of "signatures" or "rules" associated with its policy, and can issue alerts if any elements of that network traffic match those signatures or rules. An intrusion signature management module can receive IDS signatures from one or more signature sources and store those signatures in a filesystem. The intrusion signature management module can produce rule files based on these IDS signatures, e.g., containing subsets of the received IDS signatures. These rule files can be provided to a version control server, and can later be accessed by an orchestration module. The orchestration module can deploy these rule files to their respective IDS programs, enabling those IDS programs to monitor their respective data feeds in accordance with the rule files.

20 Claims, 15 Drawing Sheets

(56) References Cited

U.S. PATENT DOCUMENTS

| 2015/0074756 | A1* | 3/2015 | Deng | ................. | H04L 63/1433 |
| | | | | | 726/1 |
| 2016/0373483 | A1* | 12/2016 | Schwartz | ............ | H04L 63/1491 |
| 2017/0295191 | A1* | 10/2017 | Choi | ................... | H04L 67/1014 |
| 2020/0213359 | A1* | 7/2020 | Arbel | ...................... | H04L 63/20 |
| 2024/0007483 | A1* | 1/2024 | Kleymenov | .......... | G06F 21/564 |

* cited by examiner

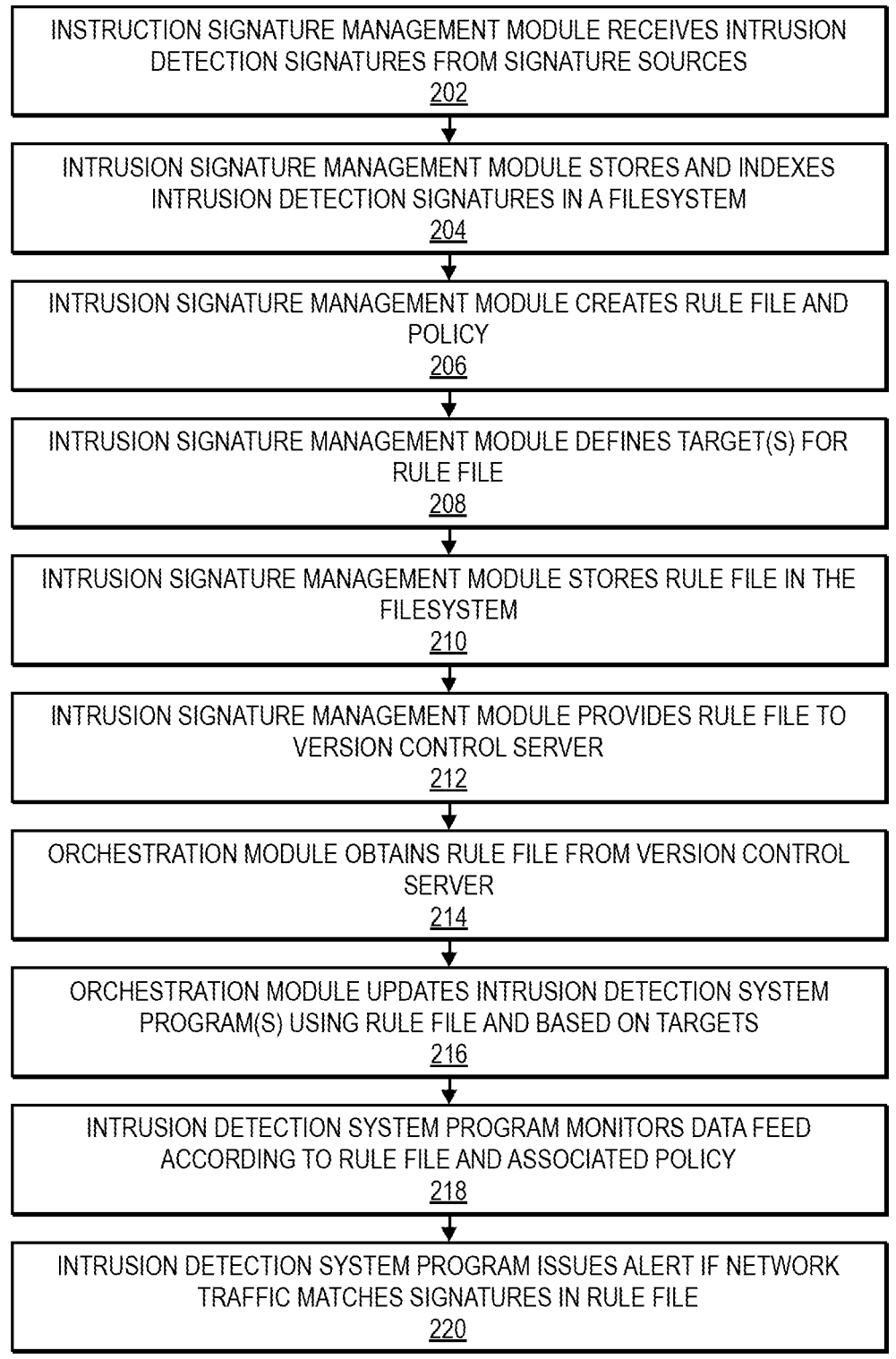

INSTRUCTION SIGNATURE MANAGEMENT MODULE RECEIVES INTRUSION
DETECTION SIGNATURES FROM SIGNATURE SOURCES
202

INTRUSION SIGNATURE MANAGEMENT MODULE STORES AND INDEXES
INTRUSION DETECTION SIGNATURES IN A FILESYSTEM
204

INTRUSION SIGNATURE MANAGEMENT MODULE CREATES RULE FILE AND
POLICY
206

INTRUSION SIGNATURE MANAGEMENT MODULE DEFINES TARGET(S) FOR
RULE FILE
208

INTRUSION SIGNATURE MANAGEMENT MODULE STORES RULE FILE IN THE
FILESYSTEM
210

INTRUSION SIGNATURE MANAGEMENT MODULE PROVIDES RULE FILE TO
VERSION CONTROL SERVER
212

ORCHESTRATION MODULE OBTAINS RULE FILE FROM VERSION CONTROL
SERVER
214

ORCHESTRATION MODULE UPDATES INTRUSION DETECTION SYSTEM
PROGRAM(S) USING RULE FILE AND BASED ON TARGETS
216

INTRUSION DETECTION SYSTEM PROGRAM MONITORS DATA FEED
ACCORDING TO RULE FILE AND ASSOCIATED POLICY
218

INTRUSION DETECTION SYSTEM PROGRAM ISSUES ALERT IF NETWORK
TRAFFIC MATCHES SIGNATURES IN RULE FILE
220

FIG. 2

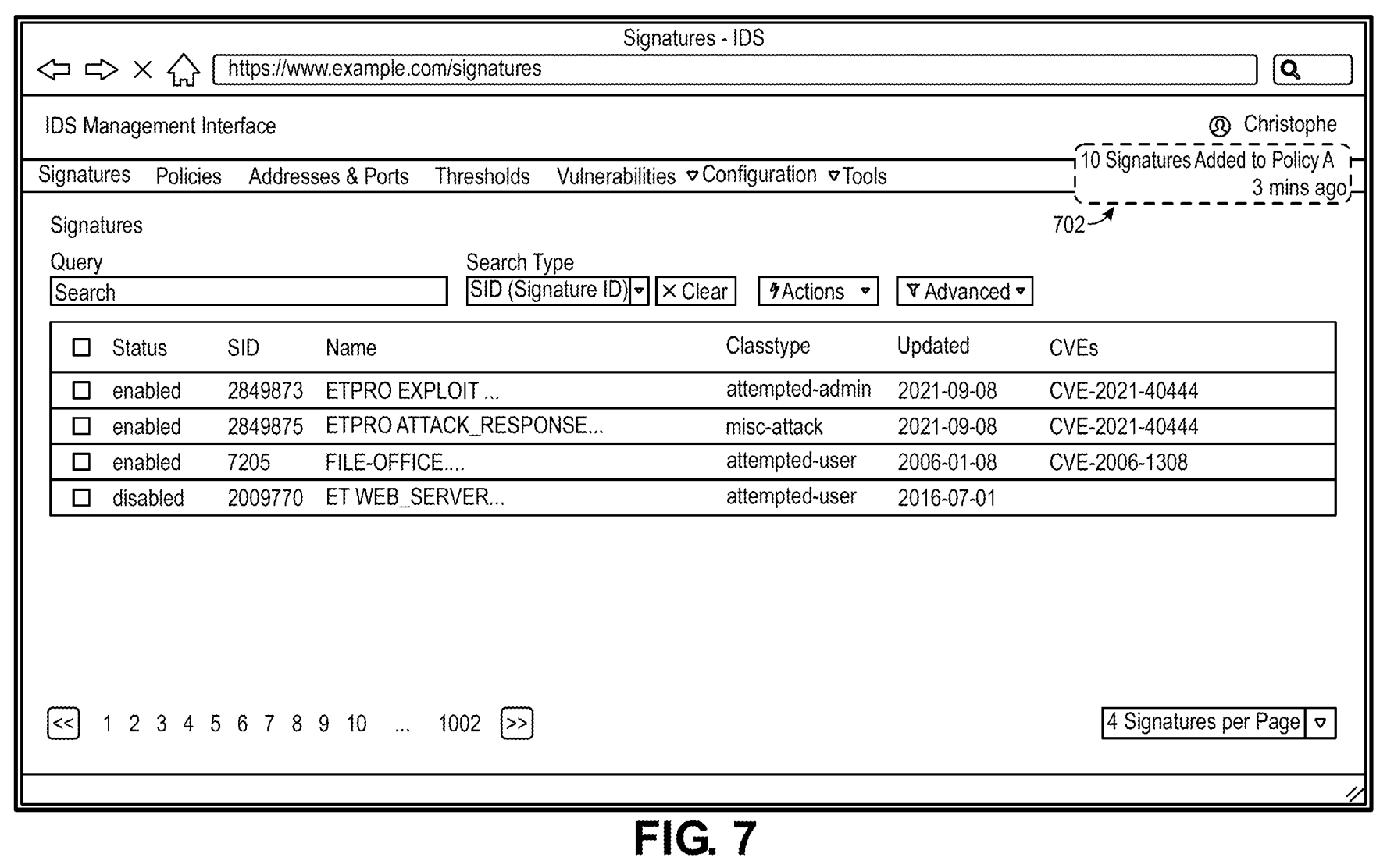

Signatures - IDS

🔍

IDS Management Interface     👤 Christophe

Signatures   Policies   Addresses & Ports   Thresholds   Vulnerabilities ▽Configuration ▽Tools ┌─────────────────────────────┐
│ 10 Signatures Added to Policy A │
│ 3 mins ago │
└─────────────────────────────┘
702

Signatures

Query

Search Type

Search   [ SID (Signature ID) ]▾   [✕ Clear]   [⚡Actions ▾]   [▽ Advanced ▾]

| ☐ | Status | SID | Name | Classtype | Updated | CVEs |
|---|---|---|---|---|---|---|
| ☐ | enabled | 2849873 | ETPRO EXPLOIT ... | attempted-admin | 2021-09-08 | CVE-2021-40444 |
| ☐ | enabled | 2849875 | ETPRO ATTACK_RESPONSE... | misc-attack | 2021-09-08 | CVE-2021-40444 |
| ☐ | enabled | 7205 | FILE-OFFICE.... | attempted-user | 2006-01-08 | CVE-2006-1308 |
| ☐ | disabled | 2009770 | ET WEB_SERVER... | attempted-user | 2016-07-01 | |

[<<]   1 2 3 4 5 6 7 8 9 10 ... 1002 [>>]

4 Signatures per Page ▽

FIG. 7

Signatures - IDS

🔍

ⓧ ⬆ ⬆ ⬅ https://www.example.com/signatures

① Ⓐ Christophe 🔒
⚙
Feedback Settings Logout

IDS Management Interface

Signatures  Policies  Addresses & Ports  Thresholds  Vulnerabilities  ▽Configuration  ▽Tools Signatures Query Search Type

| Search | SID (Signature ID) ▶ | ✕ Clear | ⚡Actions ▼ | ▽ Advanced ▼ |

802

| ☐ | Status | SID | Name | Classtype | Updated | CVEs |
|---|---|---|---|---|---|---|
| ☐ | enabled | 2849873 | ETPRO EXPLOIT ... | attempted-admin | 2021-09-08 | CVE-2021-40444 |
| ☐ | enabled | 2849875 | ETPRO ATTACK_RESPONSE... | misc-attack | 2021-09-08 | CVE-2021-40444 |
| ☐ | enabled | 7205 | FILE-OFFICE.... | attempted-user | 2006-01-08 | CVE-2006-1308 |
| ☐ | disabled | 2009770 | ET WEB_SERVER... | attempted-user | 2016-07-01 | |

[<<] 1 2 3 4 5 6 7 8 9 10 ... 1002 [>>]

4 Signatures per Page ▷

FIG. 8

MANAGING AND DEPLOYING CUSTOM INTRUSION DETECTION SYSTEM SIGNATURE POLICIES

CROSS-REFERENCES TO RELATED APPLICATIONS

This application is a non-provisional and claims the benefit of U.S. Provisional Patent Application No. 63/419,114, entitled "MANAGING AND DEPLOYING CUSTOM INTRUSION DETECTION SYSTEM SIGNATURE POLICIES," filed on Oct. 25, 2022, which is hereby incorporated by reference in its entirety for all purposes.

BACKGROUND

An Intrusion Detection System (IDS) can refer to a system and associated methods and software that can be used to detect "intrusions", i.e., unauthorized access to computer systems or networks of computers. An instance of an IDS program (which may be referred to as an "IDS instance") can run on a computer system (e.g., a server computer), and monitor network traffic involving that computer system. Such network traffic could include the transmission and receipt of data over a physical interface (such as an Ethernet port) on that computer system. The IDS program can attempt to identify elements of network traffic in its "data feed" (or "network feed") that match predefined "signatures" of known malicious network traffic. Such malicious network traffic can comprise network traffic that relates to intrusion attempts, such as network traffic attempting to load a trojan or other malicious software onto a computer or network. Upon identifying network traffic matching a signature (or "rule"), the IDS program can issue an alert, e.g., to a security team, a log file, etc., which can enable mitigation and prevention of such intrusions.

A "signature" can comprise some data or characteristics of network traffic that enables identification or classification of that network traffic. As an example, some intrusion attempts involve attempting to steal data from a system by attempting an out-of-bounds array access. Such attacks may be characterized by an attempt to index an array at an unusually high value or set of values, and a signature can be based off network packet data that relates to such an out-of-bounds index attempt. A "policy" which can be defined by a "rule file," can provide a list of signatures that an IDS program can use to evaluate network traffic.

While an IDS is named for its use in detecting intrusions, IDS can be used to evaluate any variety of communications or network traffic. For example, in addition to monitoring ingoing network traffic (e.g., from a network such as the Internet to a local network or individual computer system), an IDS can also monitor outgoing network traffic, e.g., from a computer system in a network to a server on the Internet. An IDS could monitor such outgoing traffic for security reasons, such as determining if users are attempting to access websites that are known to host malware or other malicious software. Alternatively, an IDS could monitor such outgoing traffic for productivity reasons, such as determining if employees are attempting to access non-work-related websites using company computer systems.

IDS in large networks may involve deploying a large number of IDS programs to monitor network traffic. Some computer systems or servers in such a network may have multiple communication interfaces, and may therefore run multiple IDS instances to monitor network traffic on those interfaces, and such network traffic may vary considerably across different interfaces or computer systems. A conventional deployment method is to create a single master policy and deploy it to each IDS instance in the network, such that each IDS program is evaluating network traffic and comparing it against the same set of signatures.

This conventional deployment method is often used because it is difficult to manage and deploy multiple policies to large numbers of IDS programs. Unfortunately, this conventional deployment method has some downsides. A single uniform policy may not be appropriate for all IDS programs in a network, due to different IDS programs receiving different network feeds. As an example, a signature designed to detect an end-user interaction (such as visiting a banned website) may not be relevant to an IDS program that monitors server-related network traffic, and is a potential source of false alerts. As a result, this conventional deployment method can result in a high false positive alert rate, limiting its usefulness.

Embodiments address these and other problems, individually and collectively.

SUMMARY

Embodiments of the present disclosure are directed to methods and systems for managing and deploying custom intrusion detection signatures to IDS programs. As described above, conventional IDS involves deploying a single uniform policy to multiple different IDS instances, in part due to the difficulty in managing and deploying multiple policies to multiple IDS instances. Embodiments however, enable efficient management and deployment of different IDS policies and rule files to different IDS programs, enabling the management and use of IDS in large and complex networks. Some embodiments provide an application with an easy to use graphical user interface, enabling users with minimal training or technical understanding of IDS to manage and deploy policies in an efficient manner, with reduced user error, and with a reduced number of false positive alerts. Further, as described in more detail below, some systems according to embodiments can be implemented in a modular manner, enabling such systems to be integrated into existing IDS without disrupting these existing systems.

In some embodiments, an "intrusion signature management module" can receive intrusion detection signatures from one or more signature sources. The intrusion signature management module can create policies using these intrusion detection signatures, which can be implemented using rule files (or ".rule files", corresponding to a ".rule" file extension associated with such files). These rule files can be provided to an version control server, which can enable the storage and management of such files. An orchestration module can retrieve the rule files from the version control server, and can deploy those rule files to IDS programs running on servers or other computer systems in a network. Those computer systems can then monitor data feeds or other network traffic based on the policies (and signatures) represented by those rule files.

In more detail, one embodiment is directed to a method for managing a plurality of data feeds with a plurality of intrusion detection signature programs. This method can be performed by a computer system comprising an orchestration module and an intrusion signature management module. The intrusion signature management module can receive a first plurality of intrusion detection signatures from one or more signature sources, which can include one or more internal signature sources and one or more external signature sources. The intrusion signature management module can create a rule file comprising a second plurality of intrusion detection signatures and corresponding to a policy. The second plurality of intrusion detection signatures can be derived from the first plurality of intrusion detection signatures. For example, the second plurality of intrusion detection signatures can be a subset of the first plurality of intrusion detection signatures. The intrusion signature management module can provide the rule file to a version control server. The orchestration module can obtain the rule file from the version control server and the orchestration module can update an intrusion detection system program associated with a data feed with the rule file. The intrusion detection system program can be configured to monitor the data feed according to the policy corresponding to the rule file.

Another embodiment is directed to a method performed by a computer system, e.g., a computer system acting as an instruction signature management module. The computer system can receive a first plurality of intrusion detection signatures from one or more signature sources. The computer system can create a rule file comprising a second plurality of intrusion detection signatures and corresponding to a policy. The second plurality of intrusion detection signatures can be derived from the first plurality of intrusion detection signatures. The computer system can provide the rule file to a version control server. An orchestration module can be configured to obtain the rule file from the version control server and update an intrusion detection system program associated with a data feed with the rule file. The intrusion detection system program can be configured to monitor the data feed according to the policy corresponding to the rule file.

Other embodiments are directed to systems, computers, and other devices configured to perform methods according to embodiments, such as the two methods described above. For example, one embodiment is directed to a computer system comprising a processor and a non-transitory computer readable medium coupled to the processor. The non-transitory computer readable medium can comprise code or instructions, executable by the processor for performing either of the methods described above.

Terms

A "server computer" may refer to a computer or a cluster of computers. A server computer may be a powerful computing system, such as a large mainframe. Server computers can also include minicomputer clusters or a group of servers functioning as a unit. As one example, a server computer can include a database server coupled to a web server. A server computer may comprise one or more computational apparatuses and may use any of a variety of computing structures, arrangements, and compilations for servicing requests from one or more client computers.

A "memory" may refer to any suitable device or devices that may store electronic data. A memory may comprise a non-transitory computer readable medium that stores instructions that can be executed by a processor to implement a desired method. Examples of memories include one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xenon, and/or XScale; and/or the like processor(s).

A "module" can comprise a part or element of a system. A module may be associated with a particular task, function, or application. Larger or more complex systems may be constructed using multiple modules working together in tandem. A "software module" can comprise a unit of software or code from which a larger or more complex program or function can be built.

A "version control server" can comprise a server computer that can be used to track changes to a file or set of files over time. A version control server can comprise or correspond to a "repository", a centralized location in which data is stored and managed. Other computer systems can communicate with a version control server in order to "push" or "commit" code or other data to the repository, which can result in such code or data being stored in the repository. Additionally, computer systems can communicate with a version control server in order to "pull" or "fetch" code or other data from the repository.

An "identifier" may include anything that enables identification of something. An example of an identifier is an identification number, which may enable unique identification of something (e.g., a device corresponding to a device identification number) based on that identifier.

An "intrusion detection system" may refer to a system that monitors network traffic. An intrusion detection system can issue an alert if suspicious activity is discovered among network traffic, including attempts to intrude on, or otherwise access a private or protected network. Intrusion detection system "programs" or "instances" can comprise executable files or other applications that monitor network traffic as part of an intrusion detection system.

"Network traffic" may refer to any data moving across moving across a computer network. Network traffic may also be referred to as "data traffic." Network traffic may include traffic between computer systems in a computer network and traffic between computer systems inside a network and computer systems outside that network. Network traffic may include network packets transmitted between computer systems according to a transmission protocol, such as the transmission control protocol (TCP) or user datagram protocol (UDP). Network traffic can correspond to a communications interface, which can comprise a physical interface (such as an Ethernet port) over which that network traffic was received by a computer system.

A "signature" may refer to a pattern or identifier in network traffic, a file, or other code or instructions. A signature may enable the unique identification of a particular "type" of network traffic, which may include malicious network traffic that targets a network or computer system. Intrusion detection systems can monitor and compare network traffic against known signatures and issue an alert if received network traffic matches those signatures.

A "data feed" can refer to a mechanism to transmit or receive a continuous or periodic "stream" of data. As an example, a data feed corresponding to network traffic could comprise network traffic related data or information (e.g., data related to the sender of a network packet, the recipient of a network packet, any data contained in the network packet, etc.), periodically transmitted to a computer system in response to receiving that network traffic at a communications interface.

BRIEF DESCRIPTION OF THE DRAWINGS

FIG. 2 shows a flowchart of a method of generating and deploying policies and rule files according to some embodiments.

FIG. 7 shows an exemplary graphical user interface showing an intrusion detection signature modification notification according to some embodiments.

FIG. 8 shows an exemplary graphical user interface showing some user-related control elements according to some embodiments.

DETAILED DESCRIPTION

Figure 1:
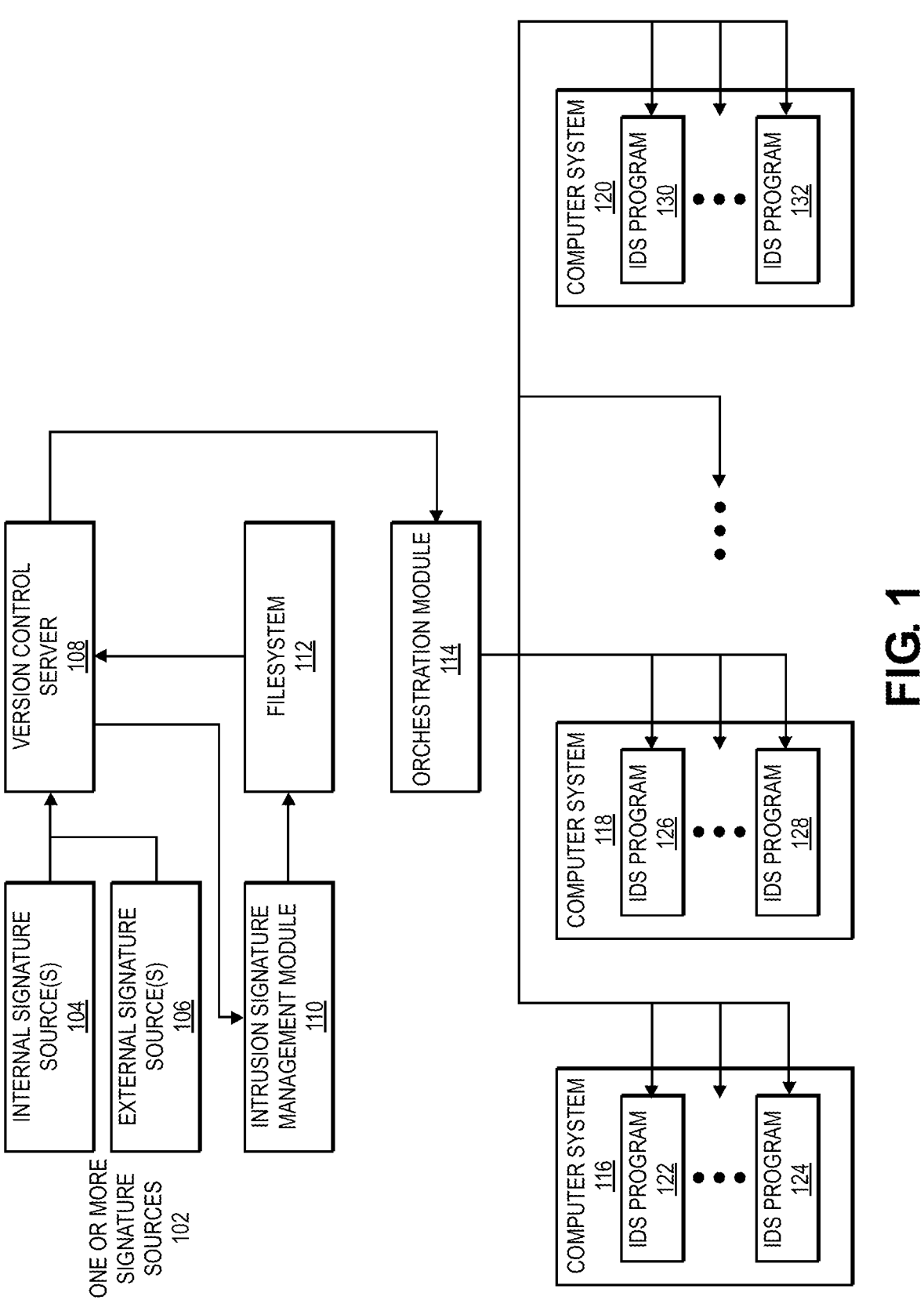
FIG. 1 shows a diagram of a system for monitoring data feeds and managing intrusion detection signature programs according to some embodiments.

Embodiments of the present disclosure may be better understood with reference to the exemplary system diagram of FIG. 1. As summarized above, an intrusion signature management module 110 can produce rule files corresponding to policies, which can be provided to a version control server 108. An orchestration module 114 can retrieve a rule file and deploy it to an IDS program (or "IDS instance") operating on a computer system (such as a server computer). As an example, orchestration module 114 can deploy a rule file to IDS program 122 operating on computer system 116. The orchestration module 114 can deploy different rule files to different IDS programs (e.g., IDS programs 122-132), enabling the deployment of custom rules files to appropriate IDS programs, and thereby reducing the overall false positive rate of those IDS programs.

IDS programs 122-132 can be configured to each manage a corresponding data feed of a plurality of data feeds. As an example, each data feed can correspond to a different communication interface of a computer system, such as different Ethernet ports. As such, IDS programs 122-132 can be configured to operate on one or more computer systems 116-120 (e.g., one or more server computers), such that one or more IDS programs operate on each computer system of the one or more computer systems 116-120. The number of IDS programs operating on a particular computer system can be proportional to the number of communications interfaces on that computer system, or can be based on the topology of a computer network comprising computer systems 116-120, the security requirements of an organization or security team, or any other appropriate rationale or criteria. Each IDS program 122-132 can evaluate its corresponding data feed by evaluating instances of network traffic associated with that data feed. Instances of network traffic (e.g., network packets) can be either transmitted or received by a computer system (e.g., server computer) operating the corresponding IDS program. For example, IDS program 122 can monitor network traffic transmitted or received by computer system 116, while IDS program 132 can monitor network traffic transmitted or received by computer system 120.

Computer systems 116-120 may comprise special purpose computer systems intended to managing and monitor network traffic on a network, and may execute their IDS programs for this purpose. For example, computer system 116 could comprise a reverse proxy that receives service request network traffic from the Internet, and routes that traffic to internal webservers to service those requests. Alternatively however, computer systems 116-120 can comprise server computers or general purpose computing systems. For example, computer system 118 could comprise a computer workstation associated with a school or other organization, and IDS program 126 could monitor web-facing network traffic from computer system 118, in order to detect when users of that workstation attempt to access banned websites.

As described above, the orchestration module can deploy rule files to IDS programs 122-132. Such rule files can correspond to policies, which can refer to data or instructions that define how an IDS program monitors network traffic and issues alerts. In some embodiments, a policy (and its corresponding rule file) can comprise a plurality of intrusion detection signatures (also referred to as "signatures"). Policies can additionally define other data or information corresponding to these signatures. For example, a policy can define "status flags" associated with intrusion detection signatures in the policy. Such status flags can indicate whether their corresponding intrusion detection signatures are "enabled" or "disabled", indicating whether an IDS program should monitor network traffic based on those signatures (e.g., if they are enabled) or should not monitor network traffic based on those signatures (e.g., if they are disabled).

An IDS program can monitor its corresponding data feed according to the policy corresponding to its received rule file. As an example, an IDS program can be configured to issue an alert of an element of data (such as a network packet) associated with its data feed matches an enabled intrusion detection signature defined or identified by the policy corresponding to its rule file. IDS programs may be configured to evaluate whether an intrusion detection signature is enabled or disabled based on a corresponding status flag, in order to determine if the IDS program should attempt to match received elements of data against that intrusion detection signature. In some cases, a rule file may correspond to multiple policies (e.g., a policy and an "additional policy"), and an IDS program can monitor a corresponding data feed according to any additional policies defined by the rule file, in addition to the "primary" policy associated with that rule file.

Issuing an alert may comprise a variety of different actions. For example, an IDS program can issue an alert by transmitting a message to an email address associated with an IT or security professional, indicating a potential intrusion (or other misuse) of a computer network comprising computer systems 116-120. Such a message could include a description of the element of data that triggered the alert, a signature that was matched to such an element of data, and/or a description of a rule that was violated, in addition to any other relevant data or information. Alternatively, an IDS program can issue an alert by pushing a message to a server computer associated with an IT or security team, saving the alert to a log file, and/or generating a ticket in an issue tracking system. As yet another alternative, an IDS program can issue an alert by transmitting a message to an automatic firewall, gateway controller, or reverse proxy system, instructing such a system to block or disable network traffic from the sender of a network packet (or other element of data) that triggered the alert. It should be understood that the examples above are intended only as non-limiting examples, and that an IDS program can issue an alert in a variety of ways not listed above.

The rule files and policies deployed to IDS programs 122-132 can be generated by intrusion signature management module 110. These rule files and policies can be based on, or derived from, sets of intrusion detection signatures. For example, a rule file and a corresponding policy can comprise a subset of intrusion detection signatures managed by intrusion signature management module 110. The intrusion signature management module 110 can receive a plurality of intrusion detection signatures from one or more signature sources 102, which can include one or more internal signature sources 104 associated with the intrusion signature management module 110 (or e.g., associated with a computer system comprising the intrusion signature management module 110), as well as one or more external signature sources 106 that are not associated with the intrusion signature management module 110 (or a corresponding computer system).

As an example, an internal signature source 104 could include a user operating an application associated with the intrusion signature management module 110. Such a user could manually enter intrusion detection signatures, or could copy those intrusion detection signatures from a file or program on their workstation. As another example, an internal signature source 104 could include a database or filesystem associated with the intrusion signature management module 110 and/or the version control server 108. Such a filesystem could store IDS signatures (including custom IDS signatures) previously developed by an individual or group managing IDS programs 122-132. As such, a filesystem such as filesystem 112 could be considered an internal signature source 104. An example of an external signature source 106 could comprise a security organization that prepares and provides lists of intrusion detection signatures, policies, and rule files to clients, who can then implement those policies and/or rule files on their IDS programs.

In some cases, the intrusion signature management module 110 may receive intrusion detection signatures from the one or more signature sources 102 "directly," e.g., via a transmission over a network such as the Internet, via user input, by accessing a database or filesystem 112, etc. As an alternative however, the intrusion signature management module 110 can receive intrusion detection signatures from one or more signature sources 102 by retrieving the intrusion detection signatures from the version control server 108. The version control server 108 could have previously received these intrusion detection signatures from the one or more signature sources 102.

In some embodiments, the intrusion signature management module 110 and the orchestration module 114 can comprise or be implemented using a single computer system. In other embodiments, the intrusion signature management module 110 can comprise an "intrusion signature management computer", a computer system that performs functions and method steps associated with the intrusion signature management module 110. As described in more detail with reference to FIG. 3, an intrusion signature management computer can comprise a processor and a non-transitory computer readable medium (e.g., a hard drive, solid-state drive, etc.) coupled to that processor. The non-transitory computer readable medium can comprise code or instructions, executable by the processor for performing some methods according to embodiments.

After receiving intrusion detection signatures from the one or more signature sources 102, either directly or via version control server 108, the intrusion signature management module 110 can produce a rule file comprising some or all of the received intrusion detection signatures (e.g., a rule file comprising a subset of the received intrusion detection signatures) and corresponding to a policy. If applicable, the intrusion signature management module 110 can create or define a status flag associated with each intrusion detection signature in the rule file. Such status flags can indicate whether their corresponding intrusion detection signatures are enabled or disabled. The intrusion signature management module can likewise define a target or targets. These target(s) can comprise identifiers of intrusion detection system programs, and can thereby specify the specific IDS programs that are to receive the rule file generated by the intrusion signature management module 110. For example, a target could specify that the rule file is to be deployed to IDS programs 122 and 130.

The intrusion signature management module 110 can store and index any data received or produced by the intrusion signature management module. In some embodiments, the intrusion signature management module can store this data in a filesystem (such as filesystem 112) associated with the intrusion signature management module. Storing such data in filesystem 112 may enable users to modify, manage, and create new rule files and policies based on the stored data. For example, a user could use intrusion signature management module 110 to enable or disable some set of signatures in an existing rule file, add new intrusion detection signatures to a rule file, or generate a new rule file by combining two existing rule files. The intrusion signature management module 110 can store and index intrusion detection signatures and rule files in the filesystem 112 based on any appropriate or applicable data. For example, the intrusion signature management module 110 can index an intrusion detection signature based on one or more signature identifiers, one or more names, one or more class types, one or more timestamps, one or more common vulnerabilities and exposures identifiers (or "CVE"), one or more targets, and/or one or more address groups. These data are described in more detail further below with reference to the table of FIG. 5.

After generating a rule file, the intrusion signature management module 110 can provide the rule file to the version control server 108. In some embodiments, the intrusion signature management module 110 can provide the rule file to the version control server 108 directly, e.g., by a direct transmission, a "push", or a "commitment" to the version control server 108. In other embodiments, the intrusion signature management module 110 can store the rule file in the filesystem 112, and the version control server 108 can be configured to retrieve the rule file from the filesystem 112.

The version control server 108 can comprise a server computer associated with a version control system or service. The version control server 108 can maintain a "repository" of data and code associated with the system depicted in FIG. 1. Such repositories can enable multiple people (or computer systems) to collaborate on computer-related tasks, such as the maintenance and deployment of rule files and policies. Data from local repositories (e.g., rule files from filesystem 112) can be "committed" to the repository on the version control server 108, enabling other computer systems (such as orchestration module 114) to access that data by "pulling" it from the repository on the version control server 108. Additionally, as noted above, intrusion detection signatures from the one or more signature sources 102 can also be committed to the version control server 108, and the intrusion signature management module 110 can retrieve these intrusion detection signatures by pulling them from the version control server 108.

It should be understood that although the description above generally describes a single rule file for ease of explanation, the intrusion signature management module 110 can be used to generate any number of rule files based on any number of intrusion detection signatures received from any number of signature sources 102. For example, the intrusion signature management module 110 could generate a first rule file associated with a first target, then subsequently generating a second rule file associated with a second target, a third rule file associated with a third target, and so forth. The intrusion signature management module 110 can provide the first rule file, second rule file, third rule file, first target, second target, third target, etc., to the version control server 108, such that they can later be deployed to different IDS programs (defined, e.g., by the first target, second target, and third target) by the orchestration module 114.

After the rule file are provided to the version control server 108, the orchestration module 114 can obtain the rule file from the version control server 108, e.g., by "pulling" the rule file from the version control server 108 using a pull request. In some embodiments, the orchestration module 114 can comprise an orchestration computer. The orchestration module 114 may be part of a computer system comprising the intrusion signature management module 110, or may be a standalone computer system. The orchestration module 114 can then update an intrusion detection system program associated with a data feed with the rule file, e.g., by "deploying" the rule file to that IDS program. As described above, that IDS program may be configured to monitor a data feed according to a policy corresponding to the rule file. The orchestration module 114 can update the IDS program using a target, which the orchestration module 114 can obtain from the version control server 108. As described above, such a target can comprise an identifier used to identify or specify an IDS program. For example, a target can specify IDS program 128, and the orchestration module 114 can update IDS program 128 using the rule file based on this target.

It should be understood that although the description above generally describes a single rule file for ease of explanation, the orchestration module 114 can be used to update any number of intrusion detection system programs associated with any number of data feeds using any number of rule files. For example, the orchestration module 114 could retrieve a first rule file, a second rule file, a third rule file, a first target, a second target, and a third target, and so on. The orchestration module 114 can update a first intrusion detection system program (associated with a first data feed) using the first rule file based on the first target, update a second intrusion detection system program (associated with a second data feed) using the second rule file based on the second target, update a third intrusion detection system program (associated with a third data feed) using the third rule file based on the third target, and so forth.

The orchestration module 114 can comprise, possess, or maintain a variety of data and code for the purpose of distributing data and code to various computer systems (e.g., computer systems 116-120) managed by the orchestration module 114. For example, the orchestration module 114 can comprise a "control node" and can maintain an "inventory" of "managed nodes", remote systems such as computer systems 116-120 that are partially or totally controlled by the orchestration module 114. Such an inventory can exist in the form of a document written in a markup language, enabling human users to easily manage and modify such an inventory. The orchestration module 114 can store or define a deployment configuration, which can define an order in which the orchestration module 114 performs operations, deploys rule files, or otherwise instructs computer systems 116-120 to perform tasks. Further, the orchestration module 114 can comprise sub-modules used to deploy rule files or deploy code or binaries (such as code or binaries corresponding to intrusion detection system programs 122-132) to computer systems 116-120.

Embodiments of the present disclosure, and the particular configuration of elements depicted in the exemplary system of FIG. 1 provide a number of advantages over conventional IDS. As described above, the use of an intrusion signature management module 110 (and any associated user applications or graphical user interfaces) enables users with minimal training or technical knowledge to quickly and accurately generate and deploy rule files to IDS programs. The intrusion signature management module 110 enables different rule files to be deployed to different IDS programs, reducing the overall false positive rate. Further, the system of FIG. 1 provides a "modular" implementation, which may be easier to integrate into existing IDS. As described above, the intrusion signature management module 110 generates rule files that are provided to a version control server 108, which are then retrieved by the orchestration module 114 and deployed to IDS programs 122-132 operating on computer systems 116-120. As a consequence, the inclusion of the intrusion signature management module 110 does not disrupt the existing "pipeline" from the version controls server 108 to the IDS programs 122-132. The configuration provides additional security or accountability benefits, as the intrusion signature management module 110 does not need to directly interface with the computer systems 116-120. As a result, it is easier to track and manage the deployment of rule files via the version control server 108, and there is less risk associated with inaccurate or erroneous deployments.

Some methods according to embodiments of the present disclosure may be better understood with reference to FIG. 2, which shows a flowchart of an exemplary method of managing a plurality of data feeds using a plurality of intrusion detection system programs. Such a method can be performed using a computer system comprising an orchestration module and an intrusion signature management module, as depicted in FIG. 1.

At step 202, the intrusion signature management module can receive a first plurality of intrusion detection signatures from one or more signature sources. As described above, the one or more signature sources can include one or more internal signature sources associated with the computer system (i.e., the computer system comprising the orchestration module and intrusion signature management module) and one or more external signature sources that are not associated with the computer system. In some embodiments, the one or more signature sources can include a user operating an application associated with the intrusion signature management module. Graphical user interfaces (GUIs) associated with such an application are described in more detail further below and with reference to FIGS. 5-12B. In some embodiments, the one or more signature sources can include a filesystem (such as filesystem 112 from FIG. 1) associated with the intrusion signature management module and/or a version control server. In some embodiments, the intrusion signature management module can receive the first plurality of intrusion detection signatures from the one or more signature sources by retrieving the first plurality of intrusion detection signatures from the version control server. The version control server may have previously received the first plurality of intrusion detection signatures from the one or more signature sources. As described above, in some embodiments, the intrusion signature management module can comprise an intrusion signature management computer.

Optionally at step 204, the intrusion signature management module can store and index the first plurality of intrusion detection signatures in a filesystem associated with the intrusion signature management module, enabling the first plurality of intrusion detection signatures to be later accessed and used to produce policies and rule files. The intrusion signature management module may store or index the first plurality of intrusion detection signatures in association with any relevant data. For example, in some embodiments, the intrusion signature management module can index one or more intrusion detection signatures of the first plurality of intrusion detection signatures based on one or more signature identifiers, one or more names, one or more class types, one or more timestamps, one or more common vulnerabilities and exposures identifiers, one or more targets, and/or one or more address groups, or any other applicable data.

In brief, a signature identifier (or "SID") can comprise a unique alphanumeric code used to identify a particular signature. A name can comprise an identifier enabling a human user to easily identify a signature or its purpose. A class type can be used to classify signatures into groups or classifications, e.g., an "administrator impersonation" class type may indicate that a signature corresponds to a class of intrusions related to impersonating administrators of a computer system or network. A timestamp may indicate some time or time period associated with a corresponding signature, e.g., the time and date at which the signature was last updated. A common vulnerabilities and exposures (CVE) identifier, may comprise an alphanumeric string that enables users to identify computer system vulnerabilities or exposures associated with a particular signatures, particularly enabling users from different organizations or nationalities to identify or communicate about such vulnerabilities and exposures. A target may indicate computer systems or IDS programs which may monitor data feeds using rule files containing the corresponding signature. Address groups may refer to collections of IP addresses corresponding to different computer systems on a computer network, which may operate IDS programs monitoring network traffic in accordance with signatures corresponding to such address groups.

The stored or indexed first plurality of intrusion detection signatures may additionally be committed to a repository associated with a version control server, enabling other computer systems (or users operating such systems) to view and access the first plurality of intrusion detection signatures, e.g., for the purpose of producing and deploying rule files to IDS programs.

At step 206, the intrusion signature management module can create a rule file. The rule file can comprise a second plurality of intrusion detection signatures and can correspond to a policy. The second plurality of intrusion detection signatures can be derived from the first plurality of intrusion detection signatures. In some embodiments, the second plurality of intrusion detection signatures can comprise the first plurality of intrusion detection signatures, e.g., the intrusion signature management module can create a rule file comprising all of the intrusion detection signatures received from the one or more signature sources. In other embodiments, the second plurality of intrusion detection signatures can comprise a subset of the first plurality of intrusion detection signatures, e.g., comprising some, but not all, of the first plurality of intrusion detection signatures.

In this way, the intrusion signature management module can create a custom rule file that is particularly applicable or useful to a particular IDS program. The rule file can contain intrusion detection signatures that are applicable to a data feed corresponding to that IDS program, and may not contain intrusion detection signatures that are not applicable to that data feed. In this way, methods according to embodiments, such as the exemplary method described with reference to FIG. 2, can reduce the number of false positive alerts issued by such IDS programs, as such IDS programs may not alert on network traffic matching irrelevant signatures.

The intrusion signature management module can create the rule file using any appropriate method, including automatic or user/operator assisted methods, including methods based on artificial intelligence or machine learning selection of intrusion detection signatures (e.g., the second plurality of intrusion detection signatures). For example, the intrusion signature management module can provide (or be associated with) an application with graphical user interfaces, enabling a user to create the rule file using these graphical user interfaces. Examples of such graphical user interfaces are described below with reference to FIGS. 5-12B. Using such graphical user interfaces, a user could use search and filtering tools to determine intrusion detection signatures that may be relevant to the rule file, define a policy corresponding to those signatures, define targets corresponding to that policy, and compile this information into a rule file, which can later be deployed to an intrusion detection system program, enabling the intrusion detection system program to monitor a data feed in accordance with the policy corresponding to the rule file.

In some embodiments, the policy can define a status flag in association with each intrusion detection signature of the second plurality of intrusion detection signatures. The policy can thereby define a plurality of status flags associated with the second plurality of intrusion detection signatures. A status flag can indicate whether the corresponding intrusion detection signature is enabled or disabled, and while monitoring a data feed (or data feeds), an intrusion detection system program can be configured to evaluate an intrusion detection signature is enabled or disabled based on its corresponding status flag. An intrusion detection system program can, in some embodiments, issue alerts if network traffic (corresponding to its data feed) match enabled intrusion detection signatures, and may not issue alerts of network traffic matches disabled intrusion detection signatures (or do not match any intrusion detection signatures contained in the rule file). Further, in some embodiments, the rule file can correspond to an additional policy (or any number of additional policies), each corresponding to any number of intrusion detection signatures, and an intrusion detection system program can be configured to monitor its data feed according to the additional policy, in addition to the policy.

At step 208, the intrusion signature management module can define targets for the rule file. As described above, these targets can indicate one or more intrusion detection system programs that are to receive the rule file and monitor one or more data feeds in accordance with the policy associated with the rule file. A target can comprise an identifier of an intrusion detection system program, which can be used to uniquely identifier the intrusion detection system program from among a plurality of intrusion detection system programs. Such an identifier can comprise, e.g., an IP address or device identifier associated with a server computer (or other computer system) executing the intrusion detection system program, in addition to any other appropriate data. Such other data could comprise an instance identifier, identifying a particular instance of an intrusion detection system program from among multiple instances of intrusion detection system programs operating on a particular server computer. In some embodiments, as described in more detail below, the intrusion signature management module can generate multiple targets associated with multiple rule files. For example, the intrusion signature management module can generate a first target associated with a first rule file (comprising an identifier of a first intrusion detection system program), a second target associated with a second rule file (comprising an identifier of a second intrusion detection system program), a third target associated with a third rule file (comprising an identifier of a third intrusion detection system program), and so forth. In this way, the intrusion signature management module can enable the deployment of different rule files to different intrusion detection system programs, enabling the management of large and complex intrusion detection systems comprising large numbers of IDS program instances.

At step 210, the intrusion signature management module can store the second plurality of intrusion detection signatures, the rule file, and/or the policy in a filesystem associated with the intrusion signature management module. Storing the second plurality of intrusion detection signatures, the rule file, and/or the policy in the filesystem may enable a user to later use these elements to produce policies and rule files. For example, a user could copy the rule file and make some modifications to the rule file (using, e.g., an application as described below with reference to FIGS. 5-12B) and save the new rule file in the filesystem and/or deploy the new rule file to an intrusion detection system program. The intrusion signature management module can store and index one or more intrusion detection signatures of the second plurality of intrusion detection signatures (and/or the rule file and/or the policy) in the filesystem based on one or more signature identifiers, one or more names, one or more class types, one or more timestamps, one or more common vulnerability and exposure identifiers, one or more targets, and/or one or more address groups, or any other appropriate data or information.

At step 212, the intrusion signature management module can provide the rule file to a version control server. The intrusion signature management module can likewise provide a corresponding target (e.g., a "first target", corresponding to the rule file) to the version control server. In some embodiments, providing the rule file to the version control server can comprise storing the rule file in a filesystem associated with the intrusion signature management module (e.g., as described above with reference to step 210), and the version control server can be configured to retrieve the rule file from the filesystem.

At step 214, the orchestration module can obtain the rule file from the version control server. Additionally, the orchestration module can obtain any applicable target or targets corresponding to the rule file (e.g., a "first target"). The orchestration module can obtain the rule file and appropriate targets by e.g., "pulling" or "fetching" the rule file and targets from a repository associated with the version control server, or via any other means, such as an HTTP "GET" request or similar methods of acquiring data from a remote computer system. As described above, in some embodiments, the orchestration module can comprise an orchestration computer.

At step 216, the orchestration module can update an intrusion detection system program associated with a data feed with the rule file. As described below, this intrusion detection system program can be configured to monitor the data feed according to the policy corresponding to the rule file, e.g., by issuing alerts when the intrusion detection system program identifiers an element of network traffic that matches an intrusion detection signature of the second plurality of intrusion detection signatures contained in the rule file. As depicted in FIG. 1, such an intrusion detection system program can be one of a plurality of intrusion detection system programs operating on one or more computer systems (e.g., server computers). As described above, using methods according to embodiments, different rule files can be deployed to different intrusion detection system programs, enabling those intrusion detection system programs to accurately monitor network traffic corresponding to different data feeds, and reducing the false positive alert rate.

The orchestration module may comprise orchestration software tools enabling remote control and software deployment to "managed nodes", i.e., computer systems managed by the orchestration module. The orchestration module can, for example, update an intrusion detection system program by transmitting an instruction to a computer system executing that intrusion detection system program. Such an instruction could, for example, order the computer system to replace any existing rule file associated with that intrusion detection system program with the rule file provided by the orchestration module, and resume monitoring network traffic in accordance with the policy corresponding to the provided rule file.

At step 218, the intrusion detection system program can monitor a data feed according to the policy corresponding to the rule file. As described above, the policy can define a status flag in association with each intrusion detection signature of the second plurality of intrusion detection signatures. The policy can thereby define a plurality of status flags associated with the second plurality of intrusion detection signatures. The intrusion detection system program can be configured to evaluate whether an intrusion detection signature (of the second plurality of intrusion detection signatures in the rule file) is enabled or disabled based on a corresponding status flag. As described above, in some cases the rule file may correspond to an additional policy, and the intrusion detection system program can be configured to monitor the data feed according to the additional policy in addition to the policy.

As described above, a plurality of intrusion detection system programs can be configured to operate on one or more server computers, such that one or more intrusion detection system programs of the plurality of intrusion detection system programs operate on each server computer of the one or more server computers. Each intrusion detection system program of the plurality of intrusion detection system programs can be configured to manage a corresponding data feed of the plurality of data feeds. The intrusion detection system programs can do so by evaluating a plurality of instances of network traffic associated with their respective data feed. Each instance of network traffic can be either transmitted or received by a server computer operating the intrusion detection system program.

At step 220, the intrusion detection system program can issue an alert if an element of data associated with the data feed (e.g., a received or transmitted network packet) matches an enabled intrusion detection signature of the second plurality of intrusion detection signatures (contained in the rule file). For example, if a received network packet corresponds to a known attempt to exploit a common system vulnerability corresponding to a signature in the rule file, the intrusion detection system program can issue an alert. The intrusion detection system program can issue an alert in a variety of ways. For example, as described above with reference to FIG. 1, the intrusion detection system program can issue an alert by transmitting a message to an email address associated with an IT or security professional, by pushing a message to a server computer associated with an IT or security team, saving the alert to a log file, generating a ticket in an issue tracking system, transmitting a message to an automatic firewall, gateway control, or reverse proxy system (instruction such a system to block or disable network traffic from the sender of the data element that triggered the alert), or any other appropriate alert issuing process.

For ease of explanation, the exemplary method of FIG. 2 was described with reference to a single rule file deployed to a single intrusion detection system program. However, it should be understood that an intrusion signature management module can generate any number of rule files that an orchestration module can subsequently retrieve and deploy to any number of intrusion detection system programs. For example, if the intrusion detection system program comprise a first intrusion detection system program, the rule file is a first rule file, the policy is a first policy, and the data feed is a first data feed, then the intrusion detection system program could also generate a second rule file and second policy that can be used by a second intrusion detection system program to monitor a second data feed, a third rule file and third policy that can be used by a third intrusion detection system program to monitor a third data feed, and so on.

Such rule files can contain intrusion detection signatures that can also be derived from the first plurality of intrusion detection signatures received at step 202. For example, the intrusion signature management module can generate a second rule file comprising a third plurality of intrusion detection signatures and corresponding to the second policy. This third plurality of intrusion detection signatures can be derived from the first plurality of intrusion detection signatures. The intrusion signature management module can generate a second target associated with the second rule file, which can comprise an identifier of the second intrusion detection system program. The intrusion signature management module can provide the second rule file and the second target to the version control server. The orchestration module can subsequently obtain the second rule file and second target from the version control server, and update a second intrusion detection system program associated with a second data feed with the second rule file based on the second target. This second intrusion detection system program can be configured to monitor the second data feed according to the second policy corresponding to the second rule file.

Alternatively, such rule files can contain intrusion detection signatures that are not derived from the first plurality of intrusion detection signatures received at step 202. For example, the intrusion signature management module can receive a fourth plurality of intrusion detection signatures from the one or more signature sources. The intrusion signature management module can subsequently create a third rule file comprising a fifth plurality of intrusion detection signatures and corresponding to a third policy. The fifth plurality of intrusion detection signatures can be derived from the fourth plurality of intrusion detection signatures. The intrusion signature management module can also produce a third target corresponding to the third rule file. The intrusion signature management module can provide the third rule file and the third target to the version control server. The orchestration module can obtain the third rule file and third target from the version control server. The orchestration module can update a third intrusion detection system program associated with a third data feed with the third rule file. The third intrusion detection system program can be configured to monitor the third data feed according to the third policy corresponding to the third rule file.

Having described an exemplary method of deploying rule files to intrusion detection system programs according to embodiments, it may be appropriate to describe the intrusion signature management module and orchestration module in more detail. The intrusion signature management module may be better understood with reference to FIG. 3, which shows an exemplary intrusion signature management module 300. In some embodiments, the intrusion signature management module 300 can comprise an intrusion signature management computer. The intrusion signature management module 300 can comprise a processor 302, a communications interface 304, and a computer readable medium 306. The computer readable medium 306 may be non-transitory and coupled to the processor 302. The computer readable medium 306 may contain data, code, and/or software modules that may be used by the intrusion signature management module 300 to implement some methods according to embodiments. These data, code, and/or software modules may include a communications module 308, a filesystem management module 310, a searching and filtering module 312, a graphical user interface module 314, application programming interface(s) 316, and a rule file and policy creation module 318.

Figure 3:
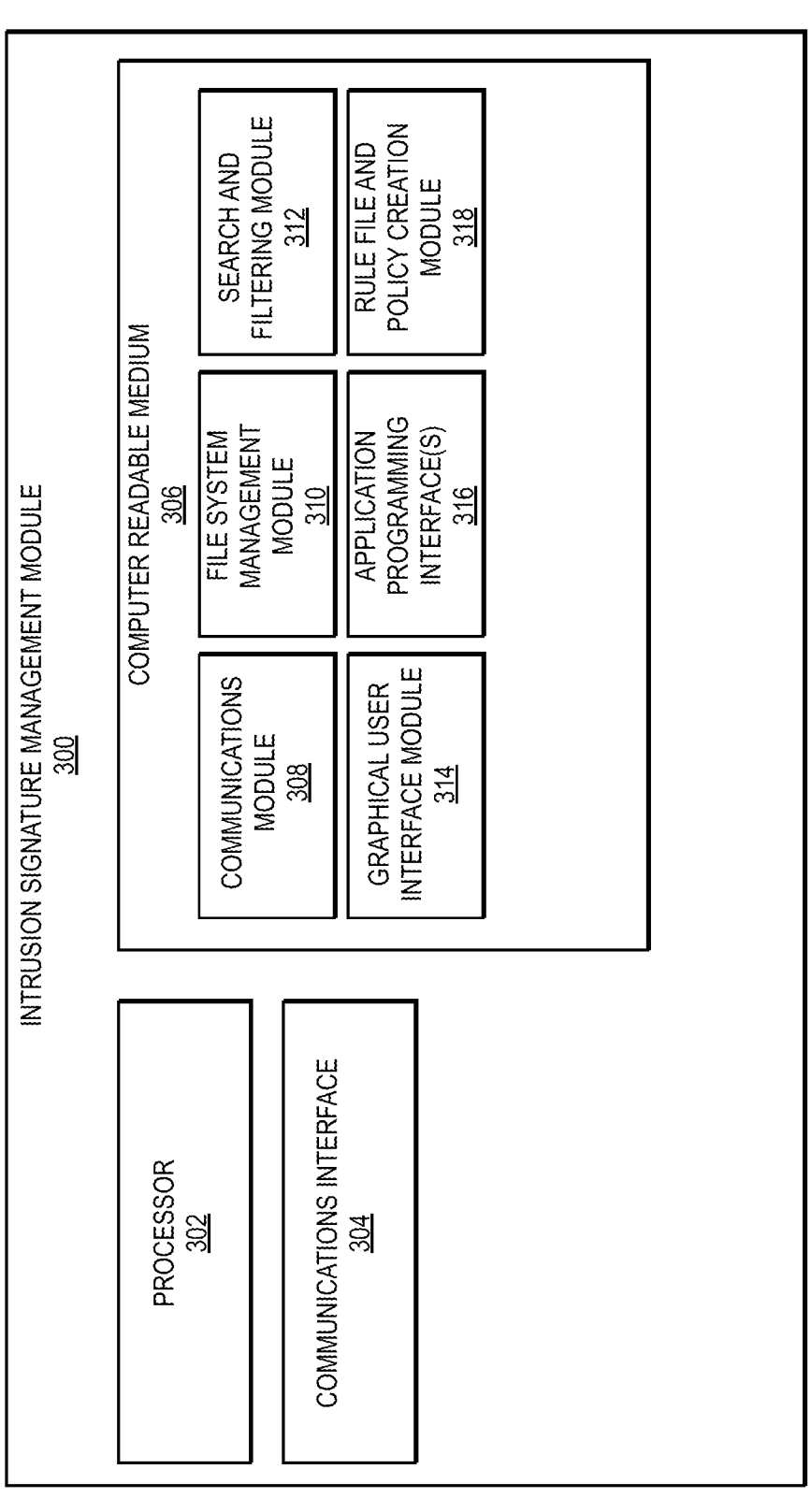
FIG. 3 shows a block diagram of a signature management module implemented using a computer system according to some embodiments.

It should be understood that the particular software modules depicted in FIG. 3 were chosen primarily for the purpose of explaining some methods, steps, or other operations according to embodiments, and that FIG. 3 shows only one of a large number of valid intrusion signature management module 300 configurations. As an alternative, a single monolithic software application could perform some or all of the functions performed by the software modules depicted in FIG. 3.

Processor 302 may comprise any suitable data computation device or devices. Processor 302 may be able to interpret code and carry out instructions stored on computer readable medium 306. Processor 302 may comprise a central processing unit (CPU) operating on a reduced instructional set (or any other appropriate instructional set), and may comprise a single or multi-core processor. Processor 302 may also include an Arithmetic Logic Unit (ALU), a cache memory, and any other structures or components typically associated with processors. Further description of processors and a list of some example processors is provided above in the terms section.

Communications interface 304 may comprise any interface by which intrusion signature management module 300 can communicate with other systems, devices, computers, or entities, such as one or more signature sources, a filesystem, and/or a version control server, e.g., as depicted in FIG. 1. Examples of communications interfaces include wired interfaces, such as USB, Ethernet, or FireWire, as well as wireless interfaces such as Bluetooth or Wi-Fi receivers. Intrusion signature management module 300 may possess multiple communications interfaces 304. As an example, intrusion signature management module 300 may communicate through an Ethernet interface, as well as a USB interface and a Bluetooth interface. Communications interface 304 may enable the intrusion signature management module 300 to communicate over communications networks such as a local area network or the Internet.

Communications module 308 may comprise code, software or instructions that may be interpreted and executed by processor 302. This software may be used by the intrusion signature management module 300 to communicate with other modules, computers, devices, and entities, such as one or more signature sources and a version control server. Particularly, the intrusion signature management module 300 can use communications module 308 to receive pluralities of intrusion detection signatures from one or more signature sources, which can include one or more internal signature sources and one or more external signature sources. Additionally, the intrusion signature management module 300 can use communications module 308 to retrieve these pluralities of intrusion detection signatures from a version control server. Further, the intrusion signature management module 300 can use communications module 308 to provide rule files (such as a first rule file, a second rule file, a third rule file, etc.) and targets (such as a first target, a second target, a third target, etc.) to the version control server.

Filesystem management module 310 may comprise code, software or instructions that may be interpreted and executed by processor 302. This software may be used by the intrusion signature management module 300 to manage, store, and retrieve data in a filesystem, such as filesystem 112 from FIG. 1. Particularly, the intrusion signature management module 300 can use filesystem management module 310 to retrieve pluralities of intrusion detection signatures from a filesystem (if, for example, that filesystem comprises a signature source). Further, the intrusion signature management module 300 can use filesystem management module 310 to store pluralities of intrusion detection signatures, rule files, and/or policies in a filesystem associated with the intrusion signature management module 300. Filesystem management module 310 can also enable the intrusion signature management module 300 to store and index one or more intrusion detection signatures based on a variety of data, such as one or more signature identifiers, one or more names, one or more class types, one or more timestamps, one or more common vulnerability and exposure identifiers, one or more targets, and/or one or more address groups. In addition, filesystem management module 310 may provide code or software that may enable intrusion signature management module 300 to perform other tasks related to the management of a filesystem, such as deleting records, files, or data (e.g., signatures or policies) stored in that filesystem, reading and writing to files in that filesystem, etc. Filesystem management module 310 may be implemented, wholly or in part, by an operating system associated with the intrusion signature management module 300.

Searching and filtering module 312 may comprise code, software or instructions that may be interpreted and executed by processor 302. This software may be used by the intrusion signature management module 300 to search for intrusion detection signatures among pluralities of intrusion detection signatures, as well as perform other filtering operations. Search and filtering module 312 can enable the intrusion signature management module 300 to identify subsets of intrusion detection signatures that may be applicable for particular policies and rule files. Further, search and filtering module 312, when used in conjunction with graphical user interfaces (provided, e.g., by graphical user interface module 314) may enable a user to identify relevant intrusion detection signatures in order to create rule files (or modify existing rule files) based on those signatures.

Graphical user interface module 314 may comprise code, software or instructions that may be interpreted and executed by processor 302. This software or code may be used by the intrusion signature management module 300 to display or otherwise provide graphical user interfaces to a user operating an application (e.g., a web-based application) associated with the intrusion signature management module 300. Generally, such graphical user interfaces may enable the user to search, filter, modify, and manage signatures, policies, rule files, address groups, port groups, or any other data used in the generation and deployment of rule files. Exemplary graphical user interfaces are described further below with reference to FIGS. 5-12B.

Application programming interface(s) 316 may comprise code, software, or instructions that may be interpreted and executed by processor 302. Such code or software may comprise programming interfaces that enable the intrusion signature management module 300, or modules on computer readable medium 306 to interface with other applications operating on intrusion signature management module 300 or on remote computer systems. For example, if an organization operating intrusion signature management module 300 uses an issue ticketing software program, application programming interface(s) 316 may enable intrusion signature management module 300 to retrieve data corresponding to that issue ticketing software program and display it on a graphical user interface provided by graphical user interface module 314. In more detail, a graphical user interface could provide a summary page corresponding to a particular intrusion detection signature. A button such as "view tickets corresponding to this signature" could be present on the graphical user interface. Clicking the button could cause the graphical user interface to retrieve ticketing data from the issue ticketing software program (via an API), which could then be displayed in the graphical user interface for the user to review.

Rule file and policy creation module 318 may comprise code, software or instructions that may be interpreted and executed by processor 302. This software or code may be used by the intrusion signature management module 300 to create rule files and policies, as described above. More specifically, the intrusion signature management module 300 can use rule file and policy creation module 318 to create rule files containing pluralities of intrusion detection signatures and corresponding to policies. The intrusion signature management module 300 can use rule file and policy creation module 318 to create and define status flags in association with intrusion detection signatures, indicating whether those signatures are enabled or disabled, as well as define targets associated with rule files and/or policies, which may be used by an orchestration module in deploying those rule files and policies.

Figure 4:
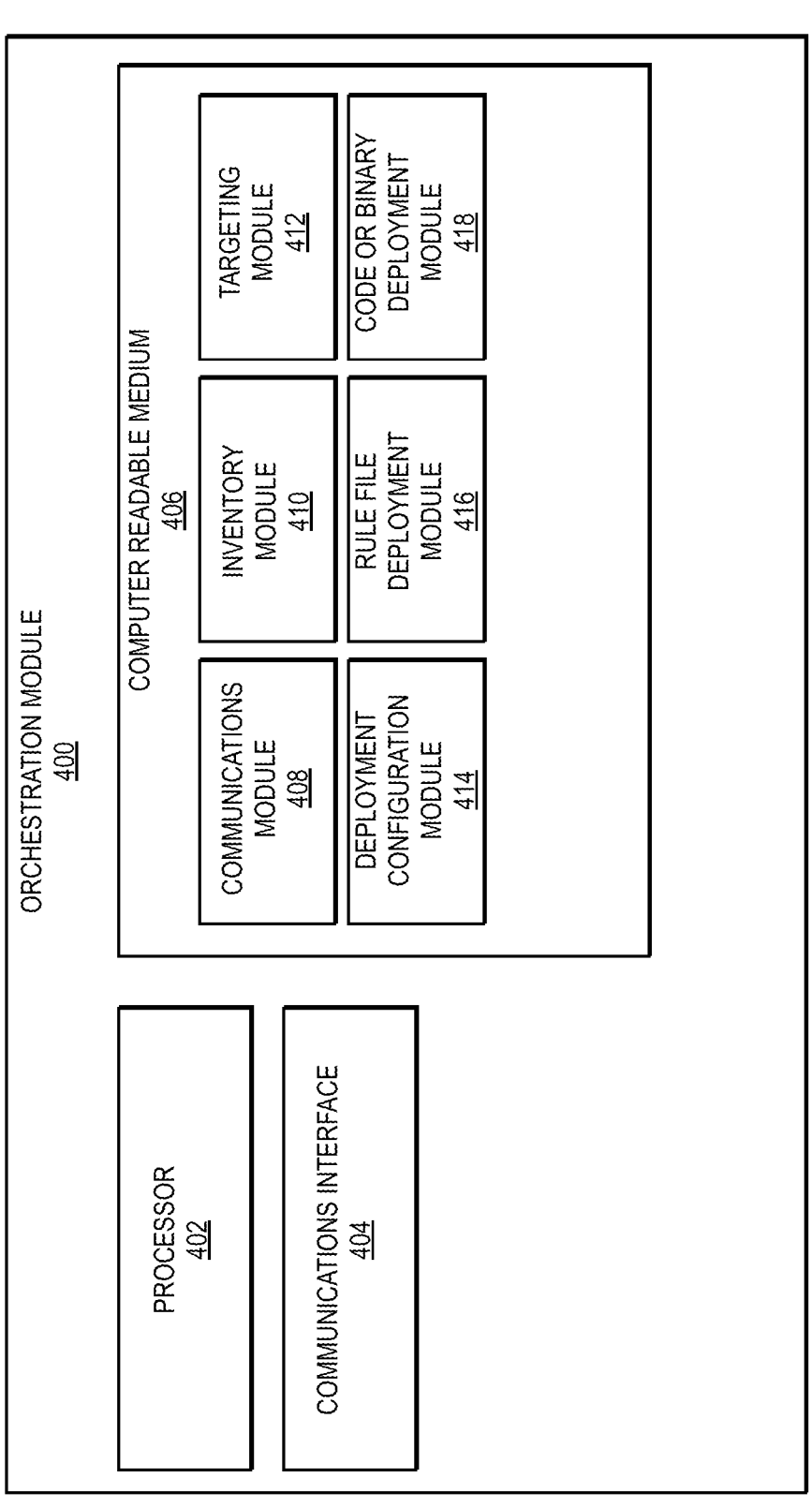
FIG. 4 shows a block diagram of an orchestration module implemented using a computer system according to some embodiments.

The orchestration module may be better understood with reference to FIG. 4, which shows an exemplary orchestration module 400. As described above, the orchestration module 400 can comprise an orchestration computer. The orchestration module 400 can comprise a processor 402, a communications interface 404, and a computer readable medium 406. The computer readable medium 406 may be non-transitory and coupled to the processor 402. The computer readable medium 406 may contain data, code, and/or software modules that may be used by the orchestration module 400 to implement some methods according to embodiments. These data, code, and/or software modules may include a communications module 408, an inventor module 410, a targeting module 412, a deployment configuration module 414, a rule file deployment module 416, and a code or binary deployment module 418.

It should be understood that the particular software modules depicted in FIG. 4 were chosen primarily for the purpose of explaining some methods, steps, or other operations according to embodiments, and that FIG. 4 shows only one of a large number of valid orchestration module configurations. As an alternative, a single monolithic software application could perform some or all of the functions performed by the software modules depicted in FIG. 4.

Processor 402 may comprise any suitable data computation device or devices. Processor 402 may be able to interpret code and carry out instructions stored on computer readable medium 406. Processor 402 may comprise a central processing unit (CPU) operating on a reduced instructional set (or any other appropriate instructional set), and may comprise a single or multi-core processor. Processor 402 may also include an Arithmetic Logic Unit (ALU), a cache memory, and any other structures or components typically associated with processors. Further description of processors and a list of some example processors is provided above in the terms section.

Communications interface 404 may comprise any interface by which orchestration module can communicate with other systems, devices, computers or entities, such as one or more server computers (operating a plurality of intrusion detection system programs) and a version control server, e.g., as depicted in FIG. 1. Examples of communication interfaces include wired interfaces, such as USB, Ethernet, or FireWire, as well as wireless interfaces such as Bluetooth or Wi-Fi receivers. Orchestration module 400 may possess multiple communications interfaces 404. As an example, orchestration module 400 may communicate through an Ethernet interface as well as a USB interface and a Bluetooth interface. Communications interface 404 may enable the orchestration module 400 to communicate over communications networks such as a local area network or the Internet.

Communications module 408 may comprise code, software or instructions that may be interpreted and executed by processor 402. This code or software may be used by orchestration module 400 to communicate with other computers, devices and entities, such as one or more server computers and a version control server. Particularly, the orchestration module 400 can use communications module 408 to obtain rule files (e.g., a first rule file, second rule file, third rule file, etc.) and targets (e.g., a first target, a second target, a third target, etc.) from a version control server, e.g., by "pulling" or "fetching" such data from a repository associated with the version control server. Additionally, the orchestration module 400 can use communications module

408 to update intrusion detection system programs (e.g., a first intrusion detection system program, a second intrusion detection system program, a third intrusion detection system program, etc.) based on corresponding targets.

Inventory module 410 may comprise code, software or instructions that may be interpreted and executed by processor 402. Inventory module 410 may enable the orchestration module 400 to maintain a list of managed nodes (i.e., an "inventory") or computer systems managed by orchestration module 400. As described above, such an inventor can exist in the form of a document written in a mark-up language, enabling human operators of the orchestration module 400 to easily manage and modify such an inventory.

Targeting module 412 may comprise code, software or instructions that may be interpreted and executed by processor 402. This code or software may enable the orchestration module 400 to identify intrusion detection system programs corresponding to targets, e.g., by enabling the orchestration module 400 to use such targets to identify corresponding managed nodes in an inventory corresponding to inventory module 410. The orchestration module 400 can use targeting module 412 to deploy rule files to their respective target intrusion detection system programs.

Deployment configuration module 414 may comprise code, software or instructions that may be interpreted and executed by processor 402. This code or software may enable the orchestration module 400 to configure the deployment of rule files, code, binaries, or other data to managed nodes. The deployment configuration module 414 can include a list of operations and tasks performed by the orchestration module 400 as part of deploying rule files, code, binaries, or other data to managed nodes.

Rule file deployment module 416 may comprise code, software or instructions that may be interpreted and executed by processor 402. The orchestration module 400 may use rule file deployment module 416 in order to deploy rule files and policies to intrusion detection systems based on targets associated with those rule files, as described above with reference to FIG. 2. Those intrusion detection system programs can subsequently monitor network traffic and issue alerts in accordance with those deployed rule files.

Code or binary deployment module 418 may comprise code, software or instructions that may be interpreted and executed by processor 402. The orchestration module 400 may use code or binary deployment module 418 to deploy intrusion detection system programs themselves to server computers or other computer systems, which can then execute those intrusion detection system programs in order to monitor network traffic. The code or binary deployment modules may comprise code, binaries, or other executable files or applications corresponding to intrusion detection system programs, which can be transmitted to and installed on those server computers or computer systems.

Figure 5:
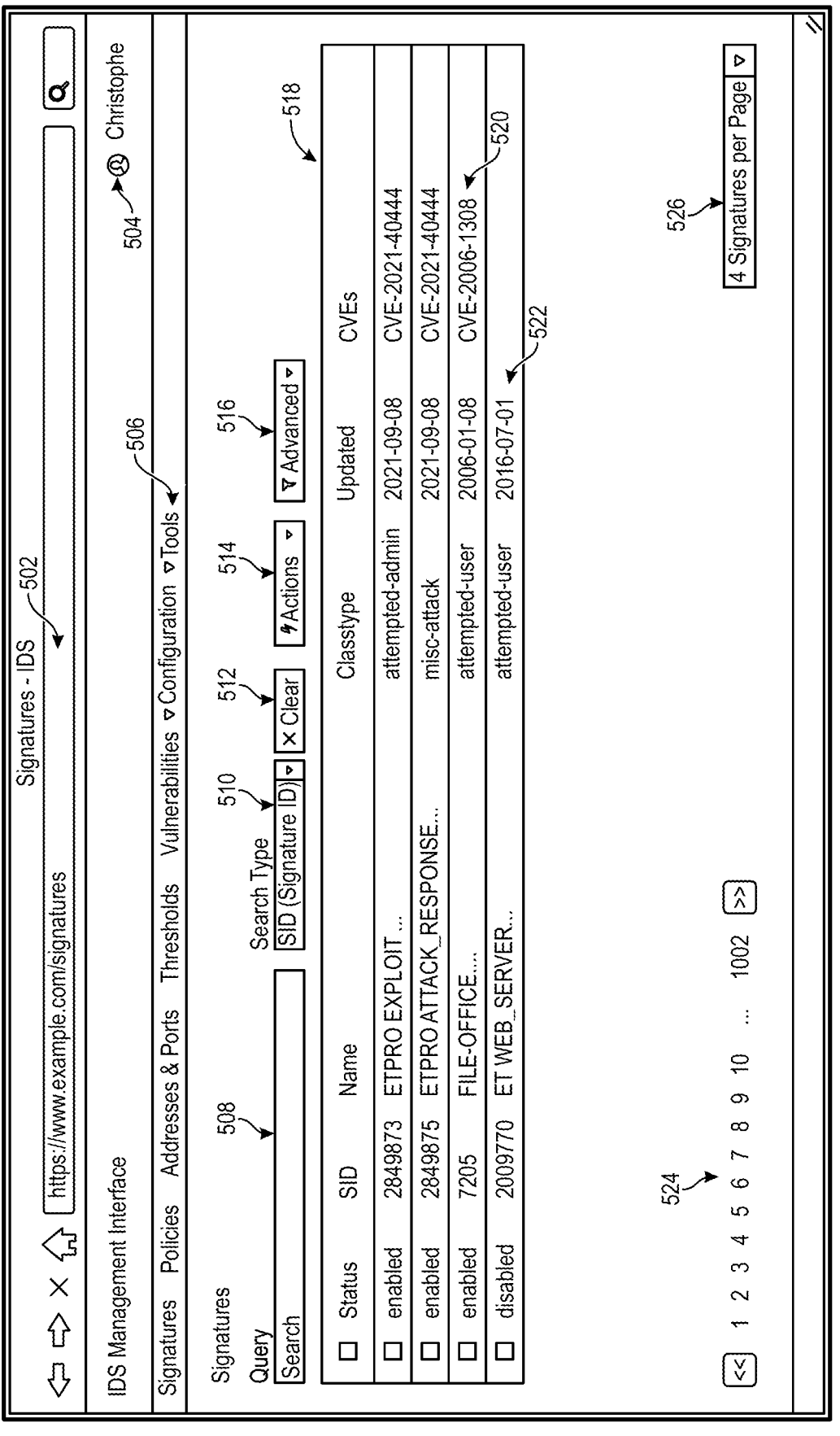
FIG. 5 shows an exemplary graphical user interface enabling a user to manage a plurality of intrusion detection signatures according to embodiments.

As described above, in some embodiments, users can use an application associated with the intrusion signature management module to manage signatures, policies, and rule files. Such an application can enable users to perform these functions via graphical user interfaces. FIGS. 5-12B show a variety of exemplary graphical user interfaces corresponding to such an application. Such an application may be implemented as a web-based application. FIG. 5 shows an exemplary graphical user interface (which could correspond to such an application) enabling a user to manage a plurality of intrusion detection signatures according to some embodiments. As depicted in FIG. 5, a user could navigate to such a graphical user interface via a URL 502. After the user performs a login process, a user identifier 504 can be displayed on the graphical user interface.

A taskbar or toolbar 506 can enable the user to navigate to different pages for the purpose of managing different aspects of IDS. FIG. 5 currently displays a "signatures" page, however, using toolbar 506, a user could navigate to a policies page, an addresses & ports page, a thresholds page, a vulnerabilities page, a configuration page, or a tools page. Some of the buttons on the toolbar 506, such as the configuration button and tools button may have associated drop down menus, which may expand as a user cursors over or clicks on the configuration button or tools buttons.

A search bar 508 can enable a user to search for relevant intrusion detection signatures, which the user can use to construct policies and/or rule files. Such intrusion detection signatures can comprise a subset of all intrusion detection signatures managed by the intrusion signature management module. Signatures identified via the search bar can be displayed in table 518 below the search bar 508. The search bar 508 can provide live search functionality, e.g., by filtering or displaying results after some number of characters (e.g., three) have been entered in the search bar, meaning that users do not need to press a search button to see the results.

Searches can be conducted via search bar 508 on a variety of data stored in association with intrusion detection signatures or used to index those intrusion detection signatures. For example, a user can perform a search on intrusion detection signatures via a signature identifier (SID), a class type, a timestamp, a common vulnerability and exposure (CVE) identifier, or any other appropriate data. The user can use a search type via search type menu 510, which can comprise a drop-down menu.

Additional buttons may be associated with search and filtering functionality, including a clear button 512, an actions button 514, and an advanced button 516. The clear button 512 may enable the user to clear any existing search terms or filters, effectively resetting the search or filtering process. Likewise, the actions button 514 may open up a drop-down menu enabling the user to take actions related to searching and filtering. For example, the actions button 514 may contain options that enable users to save search terms or results, or load previous searches or results. The advanced button 516 can open a drop-down menu housing advanced search or filtering options, such as mixed or multiple filter queries, options on the number of table columns to display in table 518.

FIG. 5 also shows a table 518 containing four exemplary signatures. Such intrusion detection signatures could comprise a subset of intrusion detection signatures received by the intrusion signature management module from one or more signature sources and/or retrieved from a version control server or filesystem. Table 518 comprises seven columns. The first, a checkbox column, can enable a user to select individual signatures or groups of signatures, e.g., enabling a user to copy those intrusion detection signatures or select them for inclusion in a policy or rule file. The second column is a status column, comprising status flags indicating whether signatures are enabled or disabled. FIG. 5 shows an exemplary enabled intrusion detection signature 520 and an exemplary disabled intrusion detection signature 522. As described above, intrusion detection programs can evaluate whether intrusion detection signatures are enabled or disabled based on status flags, and can issue alerts if they detect network traffic matching an enabled intrusion detection signature. The third column can comprise signature identifiers (SID) which can comprise alphanumeric codes used to identify particular signatures. The fourth column can comprise descriptive names, enabling human users to identify signatures. The fifth column can comprise a class type or other classification that classifies the corresponding signature. The sixth column can comprise a timestamp corresponding to the last time the signature was updated. The seventh column can comprise a common vulnerabilities and exploits identifier corresponding to the signature. As described above, the advanced button 516 can enable a user to modify the number of columns shown in table 518. The table 518 can also have a "default view," and the display options for the default view can be controlled via the advanced button 516.

Signatures displayed in the table 518 can be split into pages, and the graphical user interface of FIG. 5 can provide controls such as page selector 524 to navigate these pages or otherwise display signatures in table 518. Page selector 524 can display the total number of signature pages and enable the user to move between these pages by either clicking on page arrows or page numbers. Control 526 can be used to control the number of signatures displayed in each page.

Figure 6:
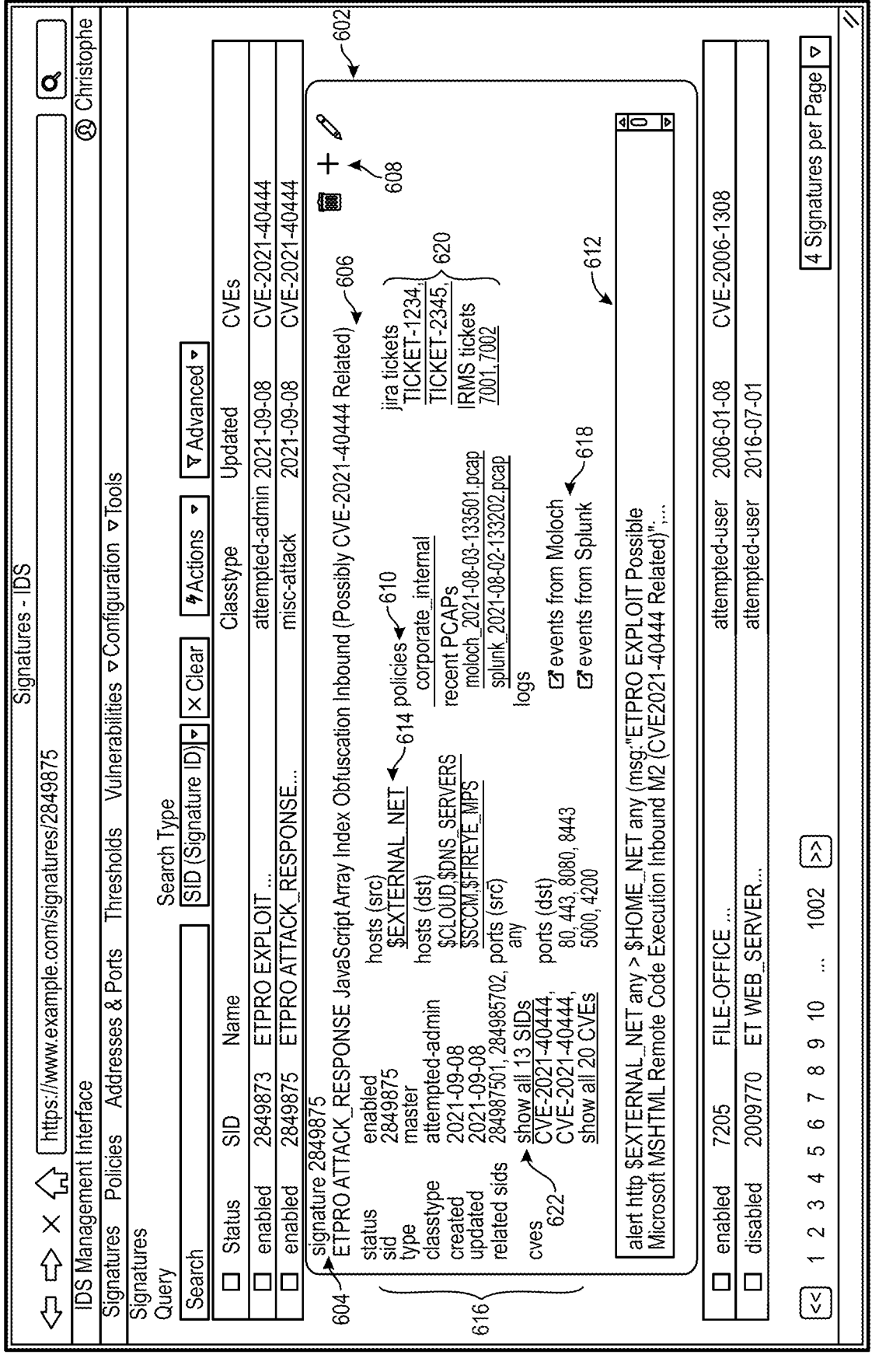
FIG. 6 shows an exemplary graphical user interface with an expanded view of an intrusion detection signature according to some embodiments.

FIG. 6 shows an exemplary graphical user interface with an expanded view 602 of an intrusion detection signature. This expanded view 602 of a signature can appear and expand downwards when a user clicks on an individual row of table 518 from FIG. 5. A user may be able to open up multiple expanded views from signatures in table 518. Any changes to search results (caused, e.g., by the user entering new search terms in a search bar) may cause expanded views such as expanded view 602 to collapse, as new signatures resulting from the search are displayed.

The expanded view 602 can contain information contained in table 518, such as a signature identifier 604 and a descriptive name 606. The expanded view 602 can also provide additional buttons 608, which can enable a user to, e.g., delete, copy, or modify the signature displayed in expanded view 602.

Further, the expanded view 602 can contain a list of policies 610. The signature in expanded view 602 can correspond to these policies, e.g., each of these policies can include the signature corresponding to expanded view 602. Expanded view 602 can also contain a text window 612 showing a rule file expression of the intrusion detection signature corresponding to expanded view 602. Additionally, expanded view 602 can contain details on host variables 614 and port variables. Clicking on a host variable or port variable may open up details related to that variable, which may be displayed to the user in a pop-up or "modal" window.

Data related to the signature displayed in expanded view 602 may be displayed in columns, such as columns 616. "Show all" buttons (such as show all button 622) may display additional information relating to the signature, such as additional signature identifiers or common vulnerabilities and exploit identifiers. Show all button 622 may not appear in expanded view 602 if there is enough space to display all relevant data. Further, data elements in columns 616 may be clickable, enabling a user to click on these data elements and perform searching or filtering operations based on those data elements (e.g., by adding them as an "OR" operation to a current filter). Expanded view 602 can also provide links to other applications, such as links 618 to event logging applications, enabling the user to identify events or alerts corresponding to the intrusion detection signature corresponding to expanded view 602. Expanded view 602 can also provide links to issue tracking systems or other ticketing systems, such as ticketing links 620.

FIG. 7 shows an exemplary graphical user interface showing an example of a "toast" or pop-up 702, which can comprise a notification informing users of changes to existing signatures or policies. Pop-up 702, for example, notifies users that 10 signatures were added to Policy A in the last three minutes. In some embodiments, pop-ups such as pop-up 702 can notify all concurrently logged-in users of changes that have been made or are about to be made to signatures or policies. After a short period of time, such pop-ups can disappear from the screen and can be stored in a pop-up or notification list for later viewing.

FIG. 8 shows an exemplary graphical user interface with some additional user related control elements, i.e., user buttons 802. Such user buttons 802 can appear when a user hovers their mouse over a user profile or user identifier, such as user identifier 504 from FIG. 5. Such buttons can include a user settings button, which can enable the user to change their settings or modify their profile, a feedback button, enabling the user to provide feedback on the GUI or the application, and a logout button, enabling the user to log out of the application.

Figure 9A:
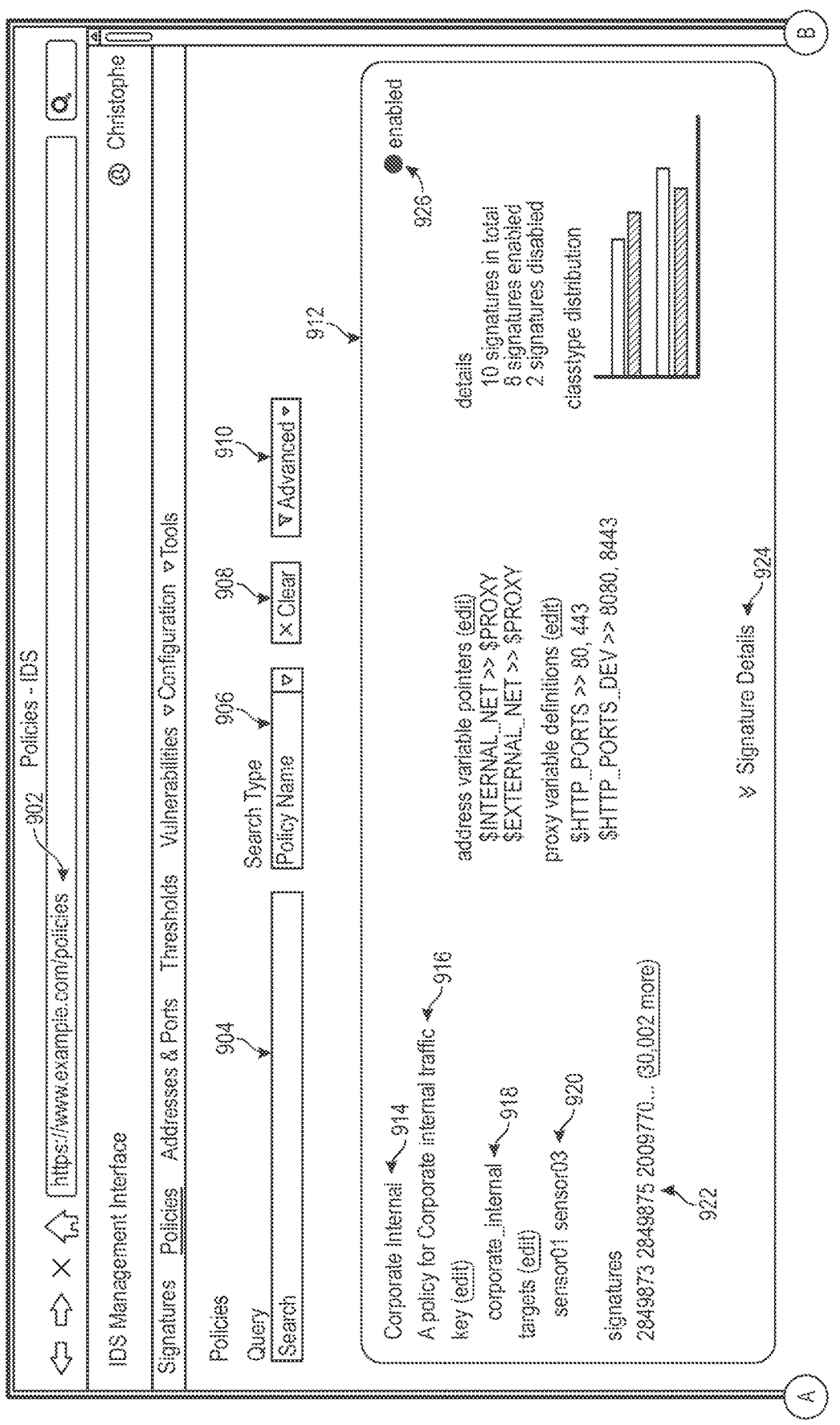
FIGS. 9A and 9B shows an exemplary graphical user interface enabling a user to manage policies according to some embodiments.
Figure 9B:
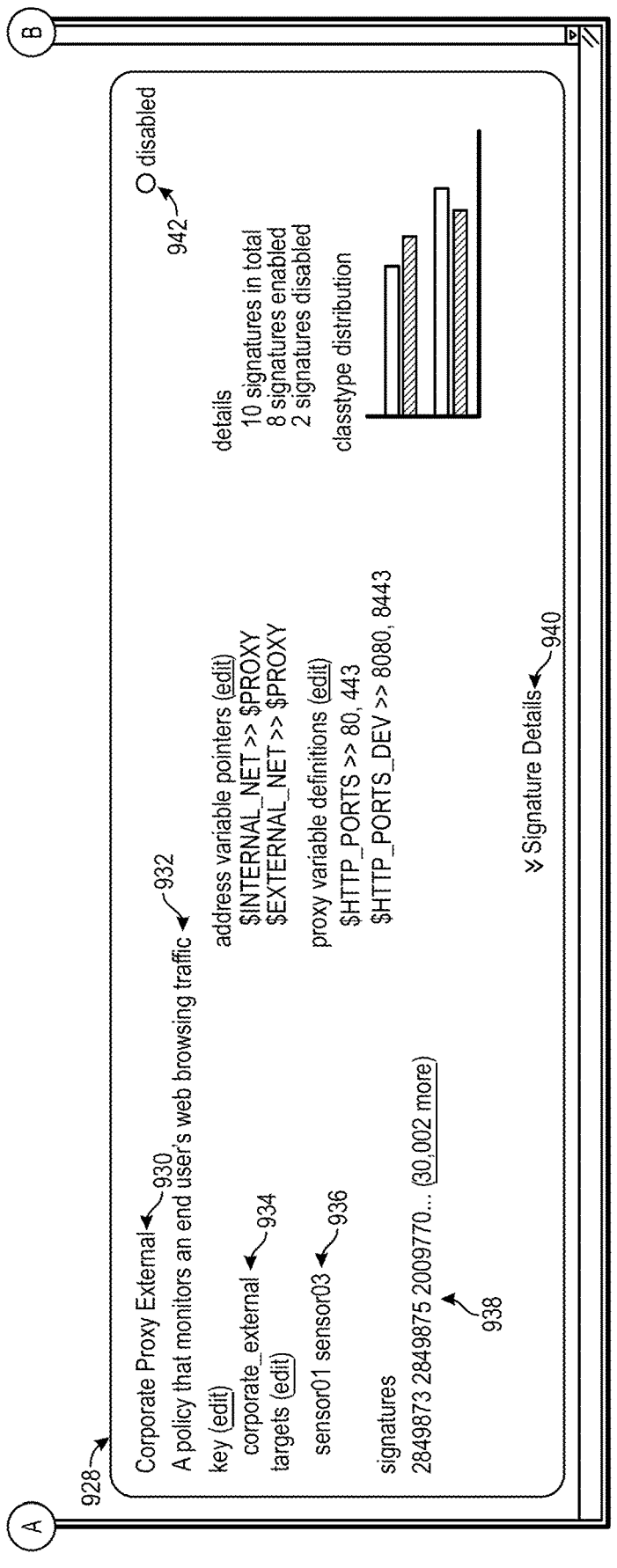

FIGS. 9A and 9B show an exemplary graphical user interface that a user can use to manage policies. If such a GUI is implemented using a web-based application, a user can navigate to the GUI of FIGS. 9A and 9B by inputting a URL such as URL 902 (FIG. 9A) in an address bar. A search bar 904 (FIG. 9A) can enable the user to search for relevant policies, which the user can use to produce corresponding rule files, which can be deployed to intrusion detection system programs. Such a search bar can provide live search functionality, e.g., by filtering or displaying results after some number of characters (e.g., three) have been entered into the search bar. FIGS. 9A and 9B show two exemplary policies 912 (FIG. 9A) and 928 (FIG. 9B) which could be identified by the user using search bar 904 (FIG. 9A). Such policies may have been stored in a filesystem by the intrusion signature management module, and/or may have been committed to a version control server.

Searches can be conducted via search bar 904 (FIG. 9A) on a variety of data stored in association with policies or used to index those policies. As an example, a user can perform a search for a policy using a policy name (such as policy names 914 (FIG. 9A) and 930 (FIG. 9B)), policy descriptions (such as policy descriptions 916 (FIG. 9A) and 932 (FIG. 9B)), policy keys (such as policy keys 918 (FIG. 9A) and 934 (FIG. 9B)), policy targets (such as policy targets 920 (FIG. 9A) and 936 (FIG. 9B)), applicable signatures (such as applicable signatures 922 (FIG. 9A) and 938 (FIG. 9B)), or any other applicable data. The user can specify a search type via search type menu 906 (FIG. 9A), which can comprise a drop-down menu.

Additional buttons may be associated with search and filtering functionality, including a clear button 908 (FIG. 9A) and an advanced button 910 (FIG. 9A). The clear button 908 (FIG. 9A) may enable the user to clear any existing search terms or filters, effectively resetting the search or filtering process. The advanced button 910 (FIG. 9A) can open a drop-down menu housing advanced search or filtering options, such as mixed or multiple filter queries, options on the data displayed in policies such as policies 912 (FIG. 9A) and 928 (FIG. 9B), etc.

Policies 912 (FIG. 9A) and 928 (FIG. 9B) can display information about the respective policies represented by the graphical user interface of FIGS. 9A and 9B. For example, policy names 914 (FIG. 9A) and 930 (FIG. 9B) can comprise user generated names corresponding to the policies. Policy descriptions 916 (FIG. 9A) and 932 (FIG. 9B) can comprise short descriptions that enable users to quickly identify the functions or use of such policies. Policy keys 918 (FIG. 9A) and 934 (FIG. 9B) can comprise strings that can be used to index their respective policies, e.g., in a database, filesystem, and/or version control server. Target(s) 920 (FIG. 9A) can identify server computer(s) (sometimes referred to as "production sensor(s)") or IDS program(s) that policy 912 (FIG. 9A) can be deployed to. Likewise, target(s) 936 (FIG. 9B) can identify server computer(s) or IDS program(s) that policy 928 (FIG. 9B) can be deployed to. Signatures 922 (FIG. 9A) and 938 (FIG. 9A) can shows signatures corresponding to (e.g., comprising) the corresponding policy. Status flags, such as status flags 926 (FIG. 9A) and 942 (FIG. 9A) can indicate whether the corresponding policies are enabled or disabled, e.g., whether IDS programs are monitoring data feeds according to the corresponding policies or not. The user can click on signature detail buttons 924 (FIG. 9A) and 940 (FIG. 9A) to display additional information about the signatures in each policy, which can include searching and filtering options corresponding to those signatures.

Figure 10A:
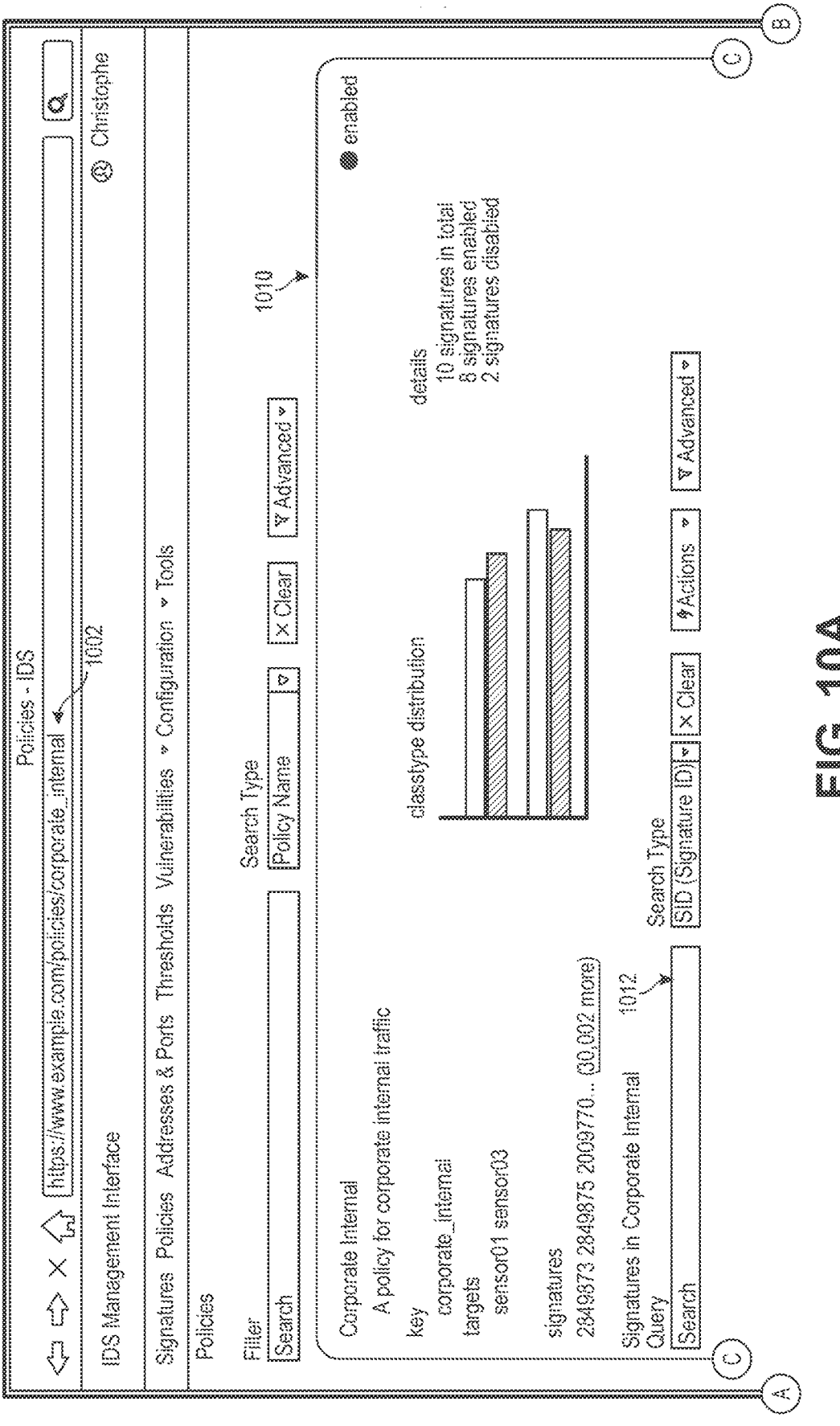
FIGS. 10A and 10B shows an exemplary graphical user interface with an expanded view of a policy according to some embodiments.
Figure 10B:
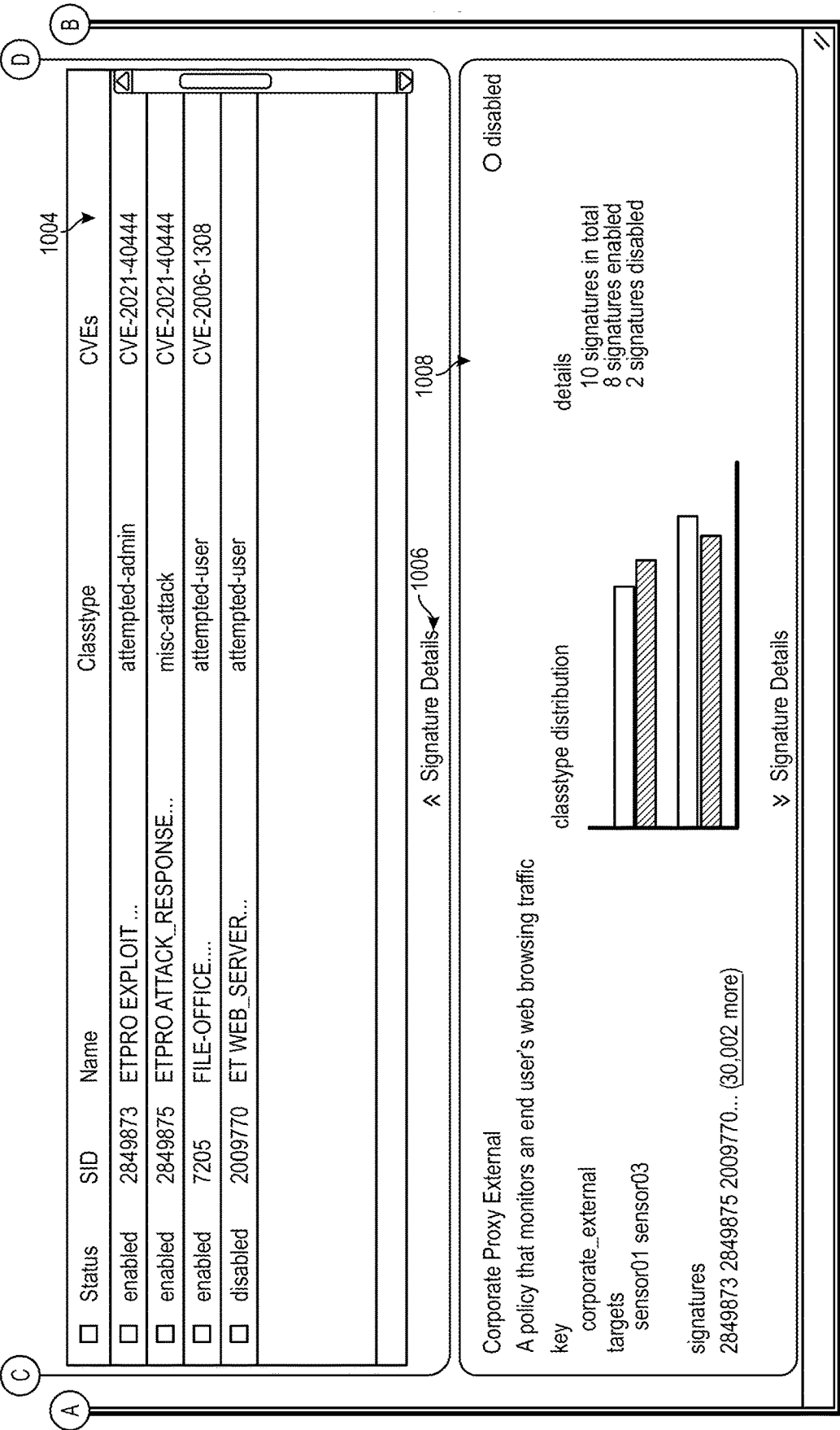

FIGS. 10A and 10B show an exemplary graphical user interface with an expanded view of a policy 1010 (FIG. 10A), which can result from a user clicking signature details button 1006 (FIG. 10A). The user can also navigate to the expanded policy visualization by inputting a URL 1002 (FIG. 10A) into a web-based application. Included in policy 1010 (FIG. 10A) is a signature table 1004 (FIG. 10A), similar to signature table 518 from FIG. 5. Policy 1010 (FIG. 10A) also shows a set of search tools 1012 (FIG. 10A), such as a search bar, enabling the user to search and filter signatures comprising policy 1010 (FIG. 10A). When a user expands one policy visualization using a signature details button, other policy visualizations, e.g., corresponding to policy 1008 (FIG. 10B), can be compressed to accommodate the expanded policy visualization.

Figure 11:
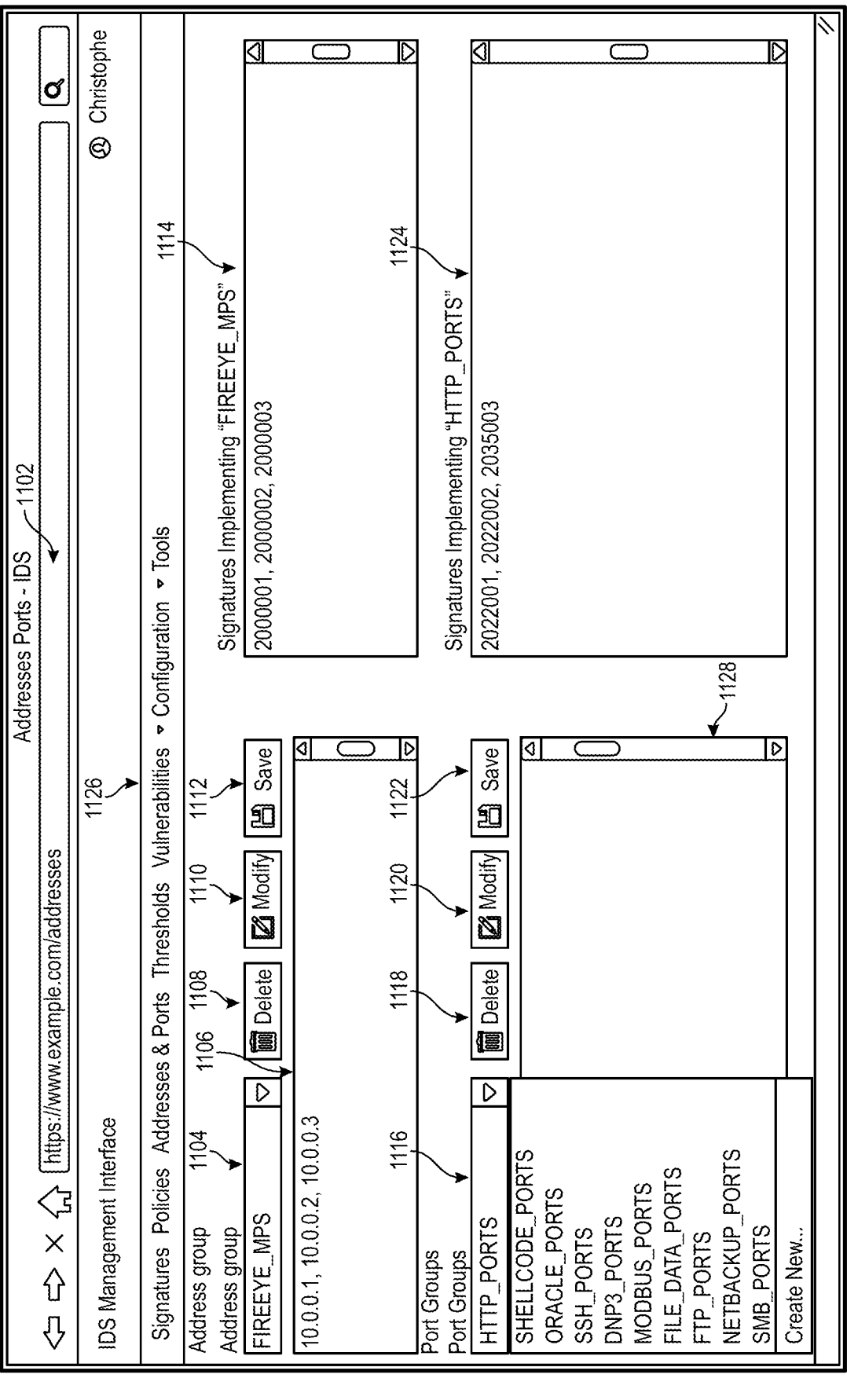
FIG. 11 shows an exemplary graphical user interface enabling a user to manage address groups and ports according to some embodiments.

FIG. 11 shows an exemplary graphical user interface enabling a user to manage address groups and port groups. A user can navigate to this management interface using a URL 1102, or via a task bar such as task bar 1126. Such an interface enables the user to manage address groups and port groups for policies and signatures. Drop-down menu 1104 can enable a user to select a particular address group or create a new address group. A text box 1106 can display addressed in an address group. A delete button 1108 can enable a user to delete individual addresses or address groups. Clicking the modify button 1110 can enable a user to edit text in the text box 1106, e.g., in order to add addresses to a particular address group. The modify button 1110 can become a cancel button when clicked, enabling the user to cancel or revert any changes to addresses in text box 1106. A save button 1112 may enable the user to save changes to addresses in an address group. A view-only field 1114 can display signature identifiers corresponding to signatures implementing this address group, enabling the user to easily find such signatures. The user can alternatively find such signatures by searching via an "address group" filter on a signature page search bar.

Drop-down menu 1116 can enable a user to select a particular port group for policies and signatures. Drop-down menu 1116 can enable a user to select a particular port group or create a new port group. A text box 1128 (partially obscured by drop-down menu 1116) can display ports in a port group. A delete button 1118 can enable a user to delete individual ports or port groups. Clicking the modify button 1120 can enable a user to edit text in the text box 1128, e.g., in order to add ports to a particular port group. The modify button 1120 can become a cancel button when clicked, enabling the user to cancel or revert any changes to ports in text box 1128. A save button 1122 may enable the user to save changes to ports in a port group. A view only field 1124 can display signature identifiers corresponding to signatures implementing the port group, enabling the user to easily find such signatures. The user can alternatively find such signatures by searching via a "port group" filter on a signature page search bar.

Figure 12A:
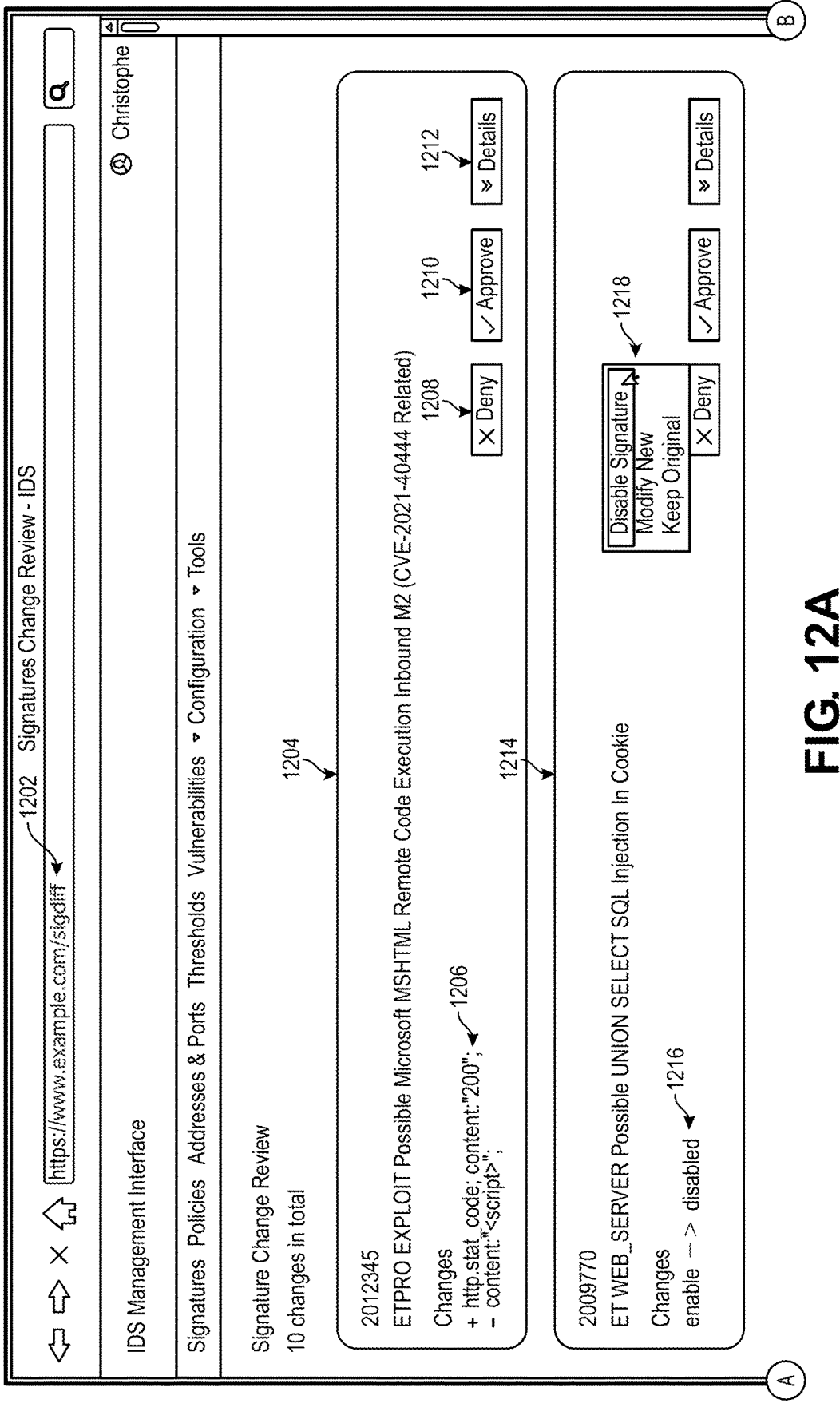
FIGS. 12A and 12B shows an exemplary graphical user interface enabling a user to track changes in intrusion detection signatures according to some embodiments.
Figure 12B:
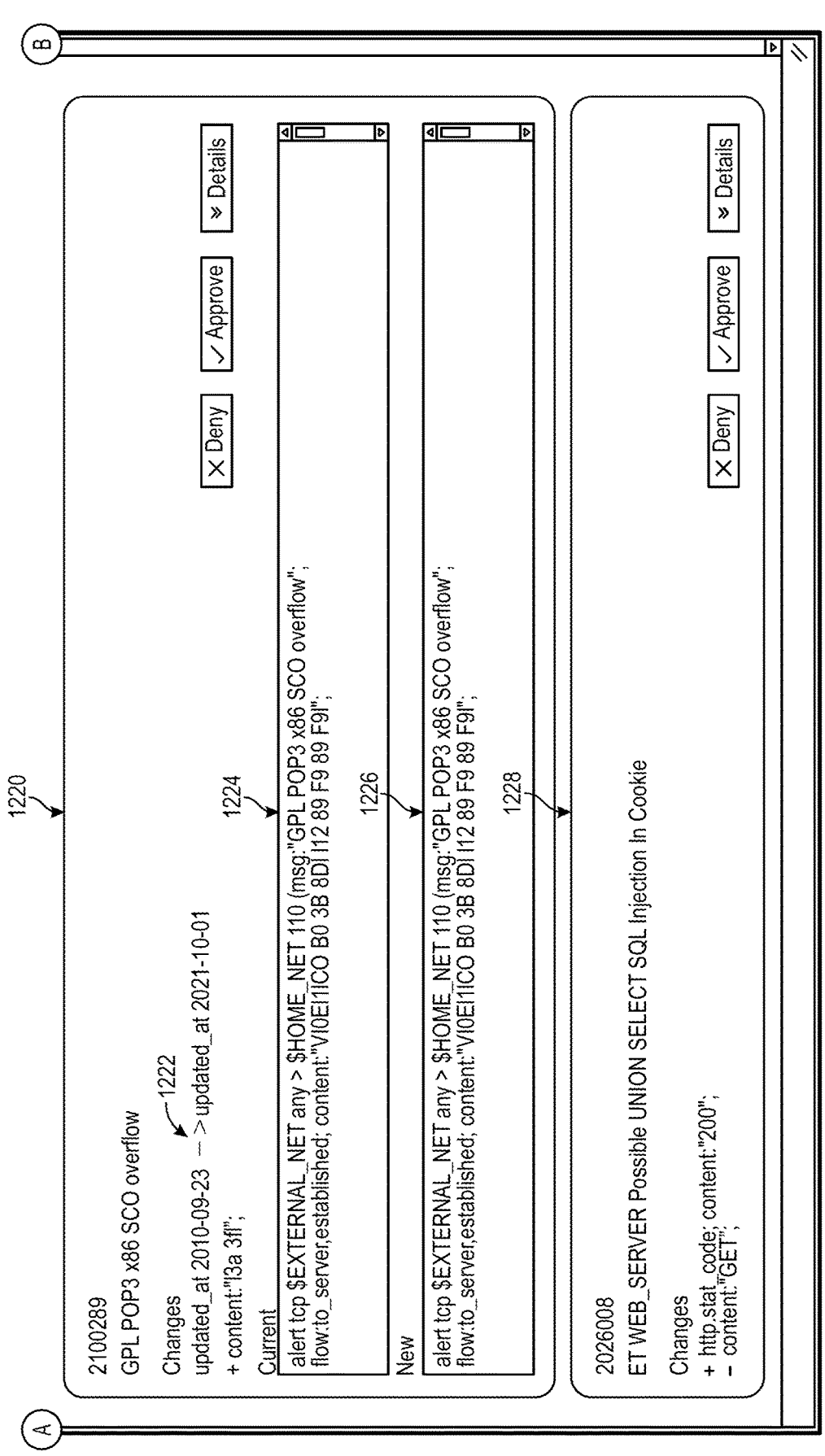

FIGS. 12A and 12B show an exemplary graphical user interface that can be used by a user to manage and review changes to signatures, including approving or denying those changes. In a web-based application, a user can navigate to such an interface with a URL such as URL 1202 (FIG. 12A). FIGS. 12A and 12B shows four signature change visualizations 1204 (FIG. 12A), 1214 (FIG. 12A), 1220 (FIG. 12B), and 1228 (FIG. 12B). A signature change visualization can display a signature identifier, as well as a signature name or description. Further, each signature change visualization can comprise a change log. Change log 1206 (FIG. 12A), for example shows that a line "http.stat_code; content:"200"; was added to a signature corresponding to signature change visualization 1204 (FIG. 12A) (e.g., signature 2012345) and a line "content:"<script>"" was removed from the signature. Change log 1214 (FIG. 12A) shows that a previously enabled signature was disabled. Change log 1222 (FIG. 12B) shows an update timestamp, as well as detailed text changes to the signature, including a depiction of the current signature text 1224 (FIG. 12B) and the new signature text 1226 (FIG. 12B) in the proposed change. The signature change visualizations 1204 (FIG. 12A), 1214 (FIG. 12A), 1220 (FIG. 12B), and 1228 (FIG. 12B) can additional comprise buttons or other UI elements enabling a user to accept, reject, or request additional details about those changes. For example, a user can use deny button 1208 (FIG. 12A) to deny changes to the signature corresponding to signature change visualization 1204 (FIG. 12A). Alternatively, the user can use approve button 1210 (FIG. 12A) to approve changes to the signature corresponding to signature change visualization 1204 (FIG. 12A). The user can use details button 1212 (FIG. 12A) to view additional details about the proposed signature change. Clicking on buttons can result in the appearance of sub-menus. For example, sub-menu 1218 (FIG. 12A) enables a user to disable the signature corresponding to signature change visualization 1214 (FIG. 12A), modify the signature, or keep the original, unchanged signature.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method for managing a plurality of data feeds with a plurality of intrusion detection system programs using a computer system comprising an orchestration module and an intrusion signature management module, comprising:

receiving, by the intrusion signature management module from one or more signature sources, a first plurality of intrusion detection signatures;

creating, by the intrusion signature management module, a rule file comprising a second plurality of intrusion detection signatures and corresponding to a policy, wherein the second plurality of intrusion detection signatures are derived from the first plurality of intrusion detection signatures;

providing, by the intrusion signature management module, to a version control server, the rule file;

obtaining, by the orchestration module, the rule file from the version control server; and updating, by the orchestration module, an intrusion detection system program associated with a data feed with the rule file, wherein the intrusion detection system program is configured to monitor the data feed according to the policy corresponding to the rule file.

2. The method of claim 1, wherein the intrusion detection system program is configured to issue an alert if an element of data associated with the data feed matches an enabled intrusion detection signature of the second plurality of intrusion detection signatures.

3. The method of claim 2 wherein the policy defines, in association with each intrusion detection signature of the second plurality of intrusion detection signatures, a status flag, the policy thereby defining a plurality of status flags associated with the second plurality of intrusion detection signatures, wherein the intrusion detection system program is configured to evaluate whether an intrusion detection signature is enabled or disabled based on a corresponding status flag.

4. The method of claim 1, wherein:

the plurality of intrusion detection system programs are configured to operate on one or more server computers, such that one or more intrusion detection system programs of the plurality of intrusion detection system programs operate on each server computer of the one or more server computers; and each intrusion detection system program of the plurality of intrusion detection system programs is configured to manage a corresponding data feed of the plurality of data feeds by evaluating a plurality of instances of network traffic associated with that data feed, wherein each instance of network traffic was either transmitted or received by a server computer operating the intrusion detection system program.

5. The method of claim 1, wherein the intrusion detection system program is a first intrusion detection system program, wherein the rule file is a first rule file, wherein the policy is a first policy, wherein the data feed is a first data feed, and wherein the method further comprises:

creating, by the intrusion signature management module, a second rule file comprising a third plurality of intrusion detection signatures and corresponding to a second policy, wherein the third plurality of intrusion detection signatures are derived from the first plurality of intrusion detection signatures, wherein the second rule file is different from the first rule file;

providing, by the intrusion signature management module, to the version control server, the second rule file;

obtaining, by the orchestration module, the second rule file from the version control server; and updating, by the orchestration module, a second intrusion detection system program associated with a second data feed with the second rule file, wherein the second intrusion detection system program is configured to monitor the second data feed according to the second policy corresponding to the second rule file.

6. The method of claim 5, further comprising:

generating, by the intrusion signature management module, a first target associated with the first rule file, wherein the first target comprises an identifier of the first intrusion detection system program;

providing, by the intrusion signature management module, to the version control server, the first target;

generating, by the intrusion signature management module, a second target associated with the second rule file, wherein the second target comprises an identifier of the second intrusion detection system program;

providing, by the intrusion signature management module, to the version control server, the second target; and obtaining, by the orchestration module, the first target and the second target, wherein the orchestration module updates the first intrusion detection system program associated with the first data feed based on the first target and updates the second intrusion detection system program associated with the second data feed based on the second target.

7. The method of claim 1, wherein the intrusion detection system program is a first intrusion detection system program, wherein the rule file is a first rule file, wherein the policy is a first policy, wherein the data feed is a first data feed, and wherein the method further comprises:

receiving, by the intrusion signature management module from the one or more signature sources, a fourth plurality of intrusion detection signatures;

creating, by the intrusion signature management module, a third rule file comprising a fifth plurality of intrusion detection signatures and corresponding to a third policy, wherein the fifth plurality of intrusion detection signatures are derived from the fourth plurality of intrusion detection signatures, wherein the third rule file is different from the first rule file;

providing, by the intrusion signature management module, to the version control server, the third rule file;

obtaining, by the orchestration module, the third rule file from the version control server; and updating, by the orchestration module, a third intrusion detection system program associated with a third data feed with the third rule file, wherein the third intrusion detection system program is configured to monitor the third data feed according to the third policy corresponding to the third rule file.

8. The method of claim 1, wherein the one or more signature sources include one or more internal signature sources associated with the computer system and one or more external signature sources that are not associated with the computer system.

9. The method of claim 1, wherein the one or more signature sources include a user operating an application associated with the intrusion signature management module.

10. The method of claim 1, wherein the one or more signature sources include a filesystem associated with the intrusion signature management module and/or the version control server.

11. The method of claim 1, wherein the second plurality of intrusion detection signatures comprises the first plurality of intrusion detection signatures.

12. The method of claim 1, wherein the second plurality of intrusion detection signatures comprise a subset of the first plurality of intrusion detection signatures.

13. The method of claim 1, further comprising storing, by the intrusion signature management module, the first plurality of intrusion detection signatures, the second plurality of intrusion detection signatures, the rule file, and/or the policy in a filesystem associated with the intrusion signature management module.

14. The method of claim 13, further comprising indexing, by the intrusion signature management module, one or more intrusion detection signatures of the first plurality of intrusion detection signatures and/or the second plurality of intrusion detection signatures based on one or more signature identifiers, one or more names, one or more class types, one or more timestamps, one or more common vulnerability and exposure identifiers, one or more targets, and/or one or more address groups.

15. The method of claim 1, wherein the intrusion signature management module comprises an intrusion signature management computer, and wherein the orchestration module comprises an orchestration computer.

16. The method of claim 1, wherein receiving the first plurality of intrusion detection signatures by the intrusion signature management module from the one or more signature sources comprises:

retrieving the first plurality of intrusion detection signatures from the version control server, wherein the version control server received the first plurality of intrusion detection signatures from the one or more signature sources.

17. The method of claim 1, wherein providing the rule file to the version control server, by the intrusion signature management module comprises:

storing the rule file in a filesystem associated with the intrusion signature management module, wherein the version control server is configured to retrieve the rule file from the filesystem.

18. The method of claim 1, wherein the rule file corresponds to an additional policy and wherein the intrusion detection system program is configured to monitor the data feed according to the additional policy in addition to the policy.

19. A method comprising:

receiving, by a computer system, from one or more signature sources, a first plurality of intrusion detection signatures;

creating, by the computer system, a rule file comprising a second plurality of intrusion detection signatures and corresponding to a policy, wherein the second plurality of intrusion detection signatures are derived from the first plurality of intrusion detection signatures; and providing, by the computer system, to a version control server, the rule file, wherein an orchestration module is configured to obtain the rule file from the version control server and update an intrusion detection system program associated with a data feed with the rule file, wherein the intrusion detection system program is configured to monitor the data feed according to the policy corresponding to the rule file.

20. A computer system comprising:

a processor; and a non-transitory computer readable medium coupled to the processor, the non-transitory computer readable medium comprising code or instructions, executable by the processor for performing a method comprising:

receiving a first plurality of intrusion detection signatures from one or more signature sources;

creating a rule file comprising a second plurality of intrusion detection signatures and corresponding to a policy, wherein the second plurality of intrusion detection signatures are derived from the first plurality of intrusion detection signatures; and providing to a version control server, the rule file, wherein an orchestration module is configured to obtain the rule file from the version control server and update an intrusion detection system program associated with a data feed with the rule file, wherein the intrusion detection system program is configured to monitor the data feed according to the policy corresponding to the rule file.

* * * * *